United States Patent
Ike et al.

(10) Patent No.: US 7,701,612 B2
(45) Date of Patent: Apr. 20, 2010

(54) IMAGE PROCESSING METHOD, PROGRAM AND APPARATUS HAVING PLURAL HALFTONING METHODS INCLUDING ERROR DIFFUSION USING A LARGER NUMBER OF BITS

(75) Inventors: Takahiro Ike, Tokyo (JP); Masakazu Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 822 days.

(21) Appl. No.: 11/520,501

(22) Filed: Sep. 12, 2006

(65) Prior Publication Data
US 2007/0058201 A1    Mar. 15, 2007

(30) Foreign Application Priority Data

Sep. 14, 2005   (JP)   ............... 2005-266283
Sep. 8, 2006    (JP)   ............... 2006-243684

(51) Int. Cl.
*H04N 1/405*   (2006.01)
*H04N 1/52*    (2006.01)

(52) U.S. Cl. .............. 358/2.1; 358/3.03; 358/3.06; 358/3.21; 358/3.23; 358/534

(58) Field of Classification Search ................ 358/1.9, 358/2.1, 3.03–3.06, 3.13, 3.14, 3.21, 3.23, 358/534–536; 382/252
See application file for complete search history.

(56) References Cited

U.S. PATENT DOCUMENTS

| | | | |
|---|---|---|---|
| 6,385,344 B2 * | 5/2002 | Irie et al. ............ | 358/1.9 |
| 7,083,247 B2 | 8/2006 | Yoshida et al. | |
| 7,280,249 B2 * | 10/2007 | Ohta ................ | 358/1.9 |
| 2004/0218221 A1 | 11/2004 | Hirano et al. | |
| 2006/0044616 A1 | 3/2006 | Satoh et al. | |

FOREIGN PATENT DOCUMENTS

| | | | |
|---|---|---|---|
| EP | 665677 A2 * | 8/1995 | |
| JP | 2004-112089 | 4/2004 | |
| JP | 2007-124195 A * | 5/2007 | |

* cited by examiner

*Primary Examiner*—Scott A Rogers
(74) *Attorney, Agent, or Firm*—Cooper & Dunham LLP

(57) ABSTRACT

In an image processing method for carrying out a plurality of types of halftoning processing expressing in combination amplitude modulation having the number of tone levels smaller than that of an input image and area coverage modulation, selectively or in parallel, the plurality of types of halftoning processing comprises processing providing output image color and tone substantially identical mutually.

14 Claims, 18 Drawing Sheets

IMAGE PROCESSING METHOD, PROGRAM AND APPARATUS HAVING PLURAL HALFTONING METHODS INCLUDING ERROR DIFFUSION USING A LARGER NUMBER OF BITS

BACKGROUND

1. Technical Field

This disclosure relates to an image processing method, a program and an image processing apparatus.

2. Description of the Related Art

As an image forming apparatus such as a printer, a facsimile machine, a copier or a multifunction peripheral having the respective functions thereof in a common housing, for example, an ink jet recording apparatus is known in which a liquid drop jetting head is used as a recording head. In the ink jet recording apparatus, ink as recording liquid is jetted to a paper sheet from the ink recording head so as to carry out image forming. It is noted that the above-mentioned paper sheet on which image forming is thus carried out is not actually limited to paper, but generally means one on which liquid or such may adhere to such as an OHP, or such, which may be referred to as a to-be-recorded medium, a recording medium, recording paper, or such. As to the above-mentioned image forming, a term such as recording or printing may be used as having the same meaning.

In such an image forming apparatus, as a size of the recording liquid drop, merely on the order four sizes (i.e., corresponding to four tones), i.e., no dot, a small dot, medium dot and a large dot, for example, are available. Accordingly, it is not possible to carry out halftoning only by means of the dot size of the recording liquid drop. Therefore, in general, a dither method or an error diffusion method is known as a method for halftoning with a combination of an amplitude modulation halftoning with the use of the number of levels smaller than the original, and an area coverage modulation halftoning.

The dither method (binary dither method) is a method for binarizing by determining 1 (printing or light emitting) or 0 (not printing or not light emitting) from a comparison of a pixel tone of a corresponding coordinate point with a threshold which corresponds to each value of a dither matrix. In this method, binarized data can be obtained only from the comparison of image data to the thresholds, and thus, high speed processing is achieved.

According to the error diffusion method, an error obtained when tone image data is converted into data having the number of tone levels smaller than the original (for example, binary data) is diffused to neighboring pixels, and thus, halftoning error is reduced, together with the peripheral neighboring pixels.

Each of these dither method and error diffusion method has a way in which the number of levels is more than two. For example, Japanese Laid-open Patent Application No. 2004-112089 discloses multi-level error diffusion method.

SUMMARY

However, in general, when the halftoning method differs, apparent colors in an output image are not coincident. For example, colors of an output image obtained from halftoning according to the error diffusion method and colors of an output image obtained from halftoning according to the dither method, are not coincident in general. This is because, even when the same multi-level image data is processed, an actual data processing manner is different between the error diffusion method and the dither method. Therefore, although the number of dots thus obtained is the same, the positions of the dots formed are not coincident. That is, dispositions of the dots, and a rate as to whether or not overlapping occurs with an adjacent dot, are different, and thus, the colors in the output image differ.

As a result, when image data production according to the error diffusion method and image data production according to the dither method are carried out selectively, the colors of the output images thus obtained are not coincident with one another. In this case, this color difference may not be remarkable when these images are formed in separate paper sheets, unless they are compared with one another. However, when the different types of halftoning processing methods for multi-level image data are selected in the same image according to types of respective original image parts, the thus-displayed or recorded output image colors differ mutually, and thus, such a feeling may be given to a user that color reproducibility is not sufficient.

In an aspect of this disclosure there are provided an image forming manner for improving an output image quality by reducing color reproducibility otherwise occurring due to difference in the halftoning processing types, a program for causing a computer to carry out the image processing method, an image processing apparatus having a part of executing the image processing method, an image forming apparatus having a part of executing the image processing method, and an image forming system combining the image processing apparatus and the image forming apparatus.

In another aspect, when a plurality of types of halftoning processing methods are executed in combination of amplitude modulation having the number of tone levels smaller than that of an input image and area coverage modulation, selectively or in parallel, the plurality of types of halftoning processing methods provide output image colors and tones substantially identical mutually.

The different types of halftone processing methods may preferably be executed in the same image according to types or color ranges of particular objects. Further, designated types of halftoning processing methods may preferably be executed in the same image according to designated image parts. In this case, the designated image parts may correspond to types, color ranges or coordinate ranges of the respective objects.

Further, the plurality of types of halftoning processing methods may preferably be executed with the use of a lookup table, a function expression or a combination thereof, set in such a manner that the colors or the tones of the output image may become substantially mutually identical.

In this case, the plurality of types of halftoning processing methods may preferably include a halftoning processing method according to the error diffusion method, output of the lookup table or the function expression may preferably be data having the number of bits larger than that of the input image data, and the halftoning processing according to the error diffusion method carries out halftoning processing on the data having the larger number of bits. Further, the lookup table or the function expression used in the halftoning processing according to the error diffusion method may preferably be set particularly for each color. Further, the lookup table or the function expression used in the halftoning processing according to the error diffusion method may preferably do not use, as an output tone, for an intermediate tone range other than the maximum tone and the minimum tone, such a tone as that having a uniform tone in the area converge modulation halftoning.

Further, based on measurement results for tone characteristics obtained from halftoning processing other than that according to the error diffusion method, the lookup table or the function expression may preferably be configured with the use of tones closest to those selected from among output tones of the halftoning processing according to the error diffusion method.

In another aspect of this disclosure, there is provided a program of instructions for causing a computer to carry out the above-mentioned image processing method of carrying out a plurality of types of halftoning processing methods in combination of amplitude modulation having the number of tone levels smaller than that of an input image and area coverage modulation, selectively.

In another aspect, there is provided an image processing apparatus that has a part of carrying out the above-mentioned image processing method of carrying out a plurality of types of halftoning processing methods in combination of amplitude modulation having the number of tone levels smaller than that of an input image and area coverage modulation, selectively.

In another aspect, there is provided an image forming apparatus configured to mount a recording head which jets liquid drops of recording liquids onto a sheet of paper according to given image data, and to have a part of executing the above-mentioned image processing method.

In another aspect, there is provided an image forming system that includes the above-mentioned image processing apparatus, and an image forming apparatus mounting a recording head which jets liquid drops of recording liquids onto a sheet of paper according to image data given by the image processing apparatus.

The above-mentioned image processing method, program, image processing apparatus, image forming apparatus and image forming carry out a plurality of types of halftoning processing methods in combination of amplitude modulation having the number of tone levels smaller than that of an input image and area coverage modulation, selectively, to provide output image colors and tones substantially identical mutually. Accordingly, difference in color reproducibility due to difference in the halftoning proceeding types is reduced, and the output image quality improves.

Other aspects and further features will become more apparent from the following detailed description when read in conjunction with the accompanying drawings:

DETAILED DESCRIPTION OF THE PREFERRED EMBODIMENTS

Figure 1:
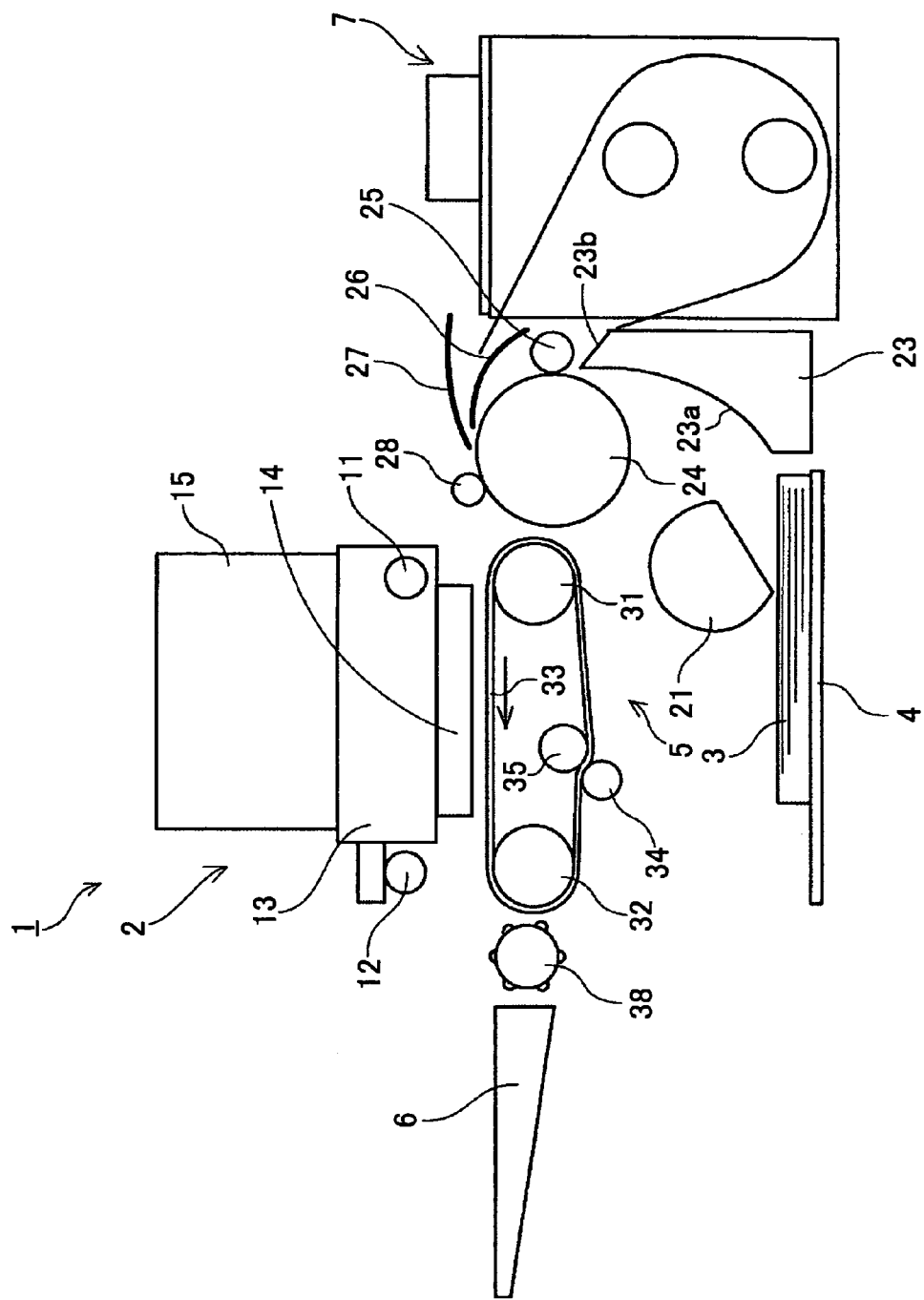
FIG. 1 shows a general configuration of a mechanism part of an ink jet recording apparatus in one example of an image forming apparatus.
Figure 2:
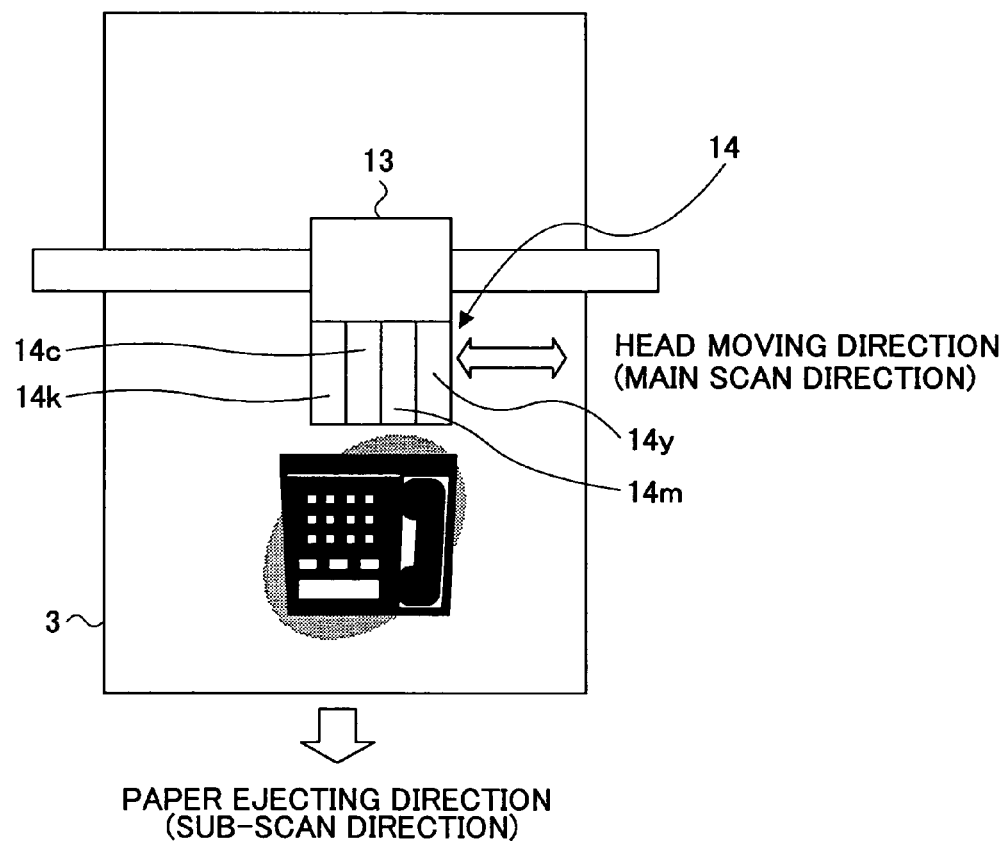
FIG. 2 illustratively shows a plan view of an essential part of the mechanism part.
Figure 3:
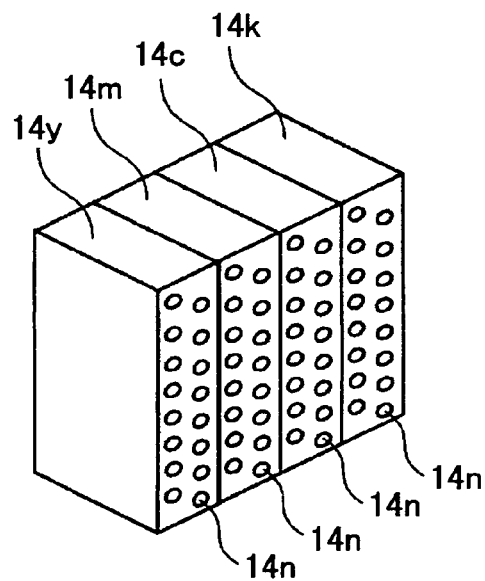
FIG. 3 illustratively shows a perspective view of a head unit of the apparatus.
Figure 4:
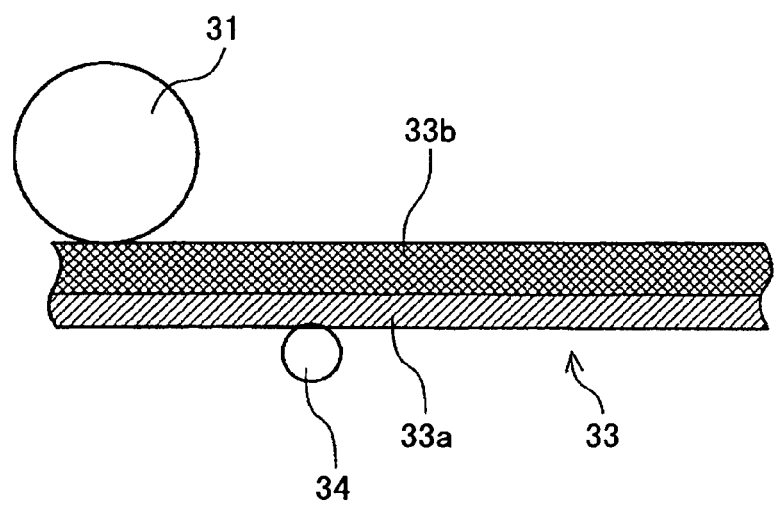
FIG. 4 illustrates one example of a conveying belt of the apparatus.

Embodiments of the present invention will now be described with reference to figures. First, with reference to FIGS. 1-4, one example of an ink jet recording apparatus as an image forming apparatus will now be described. It is noted that FIG. 1 shows a general configuration of the entirety of a mechanism part of the recording apparatus, FIG. 2 shows a plan view of an essential parts of the recording apparatus, FIG. 3 shows a perspective view for illustrating a head configuration the recording apparatus and FIG. 4 shows a diagrammatical sectional view for illustrating a conveying belt.

This ink jet recording apparatus has an image forming part 2 and so forth in an apparatus body 1, has, in a bottom part of the apparatus body 1, a paper feeding tray 4 in which many sheets of recording media (referred to as paper sheets, hereinafter) 3 are stackable, takes the paper sheet 3 fed from the paper feeding tray 4, conveys the same by means of a conveying mechanism 5, records thereon a desired image by means of the image forming part 2 while the paper sheet 3 is thus conveyed, and after that, ejects the paper sheet 3 in a paper ejecting tray 6 loaded on a side part of the apparatus body 1.

Further, the ink jet recording apparatus has a both-side unit detachable from the apparatus body 1, and, when carrying out both-side printing, after printing on one side (front side), the paper sheet 3 is conveyed reversely by means of the conveying mechanism 5, is taken by the both-side unit 7, it is inverted so that the other side (reverse side) is to be printed, then is fed to the converting mechanism 5 again, printing is made onto the other side (reverse side), and after that, the paper sheet 5 is ejected to the paper ejecting tray 6.

In the image forming part 2, a carriage 13 is slideably held by guide shafts 11, 12, and the carriage 13 is moved in a direction (main scan direction) perpendicular to the paper sheet 3 conveying direction by means of a main scan motor, not shown. This carriage 13 mounts a recording head 14 configured by a liquid drop jetting head arranging nozzle holes 14n (see FIG. 3) acting as a plurality of liquid drop jetting holes, and also, detachably mounts an ink cartridge 15 providing liquids to the recording head 14. It is noted that, instead of the ink cartridge 15, a sub-tank may be mounted, and the ink may be provided and refilled with in the sub-tank from a main tank.

As the recording head 14, as shown in FIGS. 2 and 3 for example, four separate ink jet heads 14y, 14m, 14c and 14k acting as ink drop jetting heads for respective colors, i.e., yellow (Y), magenta (M), cyan (C) and black (K), are provided. However, instead, one or a plurality of heads, having a plurality of nozzle rows jetting ink of the respective colors, may be provided. Further, the number of colors and the arranging order thereof are not limited thereto.

As the ink jet heads of the recording head 14, those having, as energy generating parts, piezoelectric actuators such as piezoelectric devices, thermal actuators using phase change by means of liquid film boiling with the use of electric heat converting devices such as heating resistance elements, shape memory alloy actuators using metal phase change according to temperature change, or electrostatic actuators using electrostatic force, may be employed.

The paper sheets 3 in the paper feeding tray 4 are fed in the apparatus body 1, as a result of being separated, sheet by sheet, by means of a paper feeding roller (meniscus roller) 21 and a separating pad, not shown, and are thus fed to the conveying mechanism 5.

The conveying mechanism 5 has a conveying guide part 23 guiding the paper sheet 3 thus fed upward along a guide surface 23a, or, guiding the paper sheet 3 fed from the both-side unit 7 along a guide surface 23b; a conveying roller 24 conveying the paper sheet 3; a pressing roller 25 pressing the paper sheet 3 onto the conveying roller 24; a guide member 26 guiding the paper sheet 3 to the side of the conveying roller 24; a guide member 27 guiding the paper sheet 3 returned in a case of both-side printing, to the both-side unit 7; and a pressing roller 28 pressing the paper sheet 3 to be fed out from the conveying roller 24.

Further, in order to convey the paper sheet 3 in such a manner that the paper sheet 3 is kept in its planarity on the recording head 14, the conveying mechanism 5 has a conveying belt 33 laid between a driving roller 31 and a following roller 32; a charging roller 34 for electrically changing the conveying belt 33; a guide roller 35 opposite to the charging roller 34; a guide member (platen plate), not shown, guiding the conveying belt 33 at a part facing the image forming part 2; and a clearing roller made of porous material acting as a clearing part to remove recording liquid (ink) adhering to the conveying belt 33.

The conveying belt is made of an endless belt, is laid between the driving roller 31 and the following roller (tension roller) 32, and is made to go around in a direction (paper conveying direction) of an arrow of FIG. 1.

This conveying belt 33 may be configured by a single layer configuration, a two layer configuration made of a first layer 33a and a second layer (reverse layer) 33b, or more than two layer configuration. For example, the conveying belt 33 may be configured by a obverse layer acting as a paper attracting surface produced by a resin material, having a thickness of on the order of 40 μm, for which no resistance control has been made, for example, an ETFE pure material, and a reverse layer (intermediate resistance layer or earth layer) having the material the same as that of the obverse layer, for which resistance control has been made by carbon.

The charging roller 34 is disposed in such a manner that it contacts the obverse layer of the conveying belt 33, and rotates following to a rotation of the conveying belt 33. This charging roller 34 has a high voltage applied in a predetermined pattern from a high voltage circuit (high voltage power source), not shown.

Further, on the downstream side of the conveying mechanism 5, the paper ejecting roller 38 is provided for feeding out the paper sheet 3 on which an image is recorded, to the paper ejecting tray 6.

In the image forming apparatus configured as described above, the conveying belt 33 goes around in the arrow direction, and is electrically charged in the positive polarity as a result of contacting the charging roller 34 to which the high voltage is applied. In this case, electrical charging is made at predetermined charging pitches, as a result of the polarity being switched at predetermined time intervals by the charging roller 34.

When the paper sheet 3 is provided onto the conveying belt 33 thus charged at the high voltage, the inside of the paper sheet 3 enters a polarized state, charge having the polarity opposite to that of the conveying belt 33 is induced onto the surface of the paper sheet 3 facing the conveying belt 33, the charge on the belt 33 and the induced charge on the paper sheet 3 thus conveyed electrostatically attract one another, and thus, the paper sheet 3 is attracted by the conveying belt 33 electrostatically. The paper sheet 3 thus positively attracted by the conveying belt 33 thus has its bending or unevenness if any corrected forcibly, and thus, has a highly flat surface created thereon.

Figure 5:
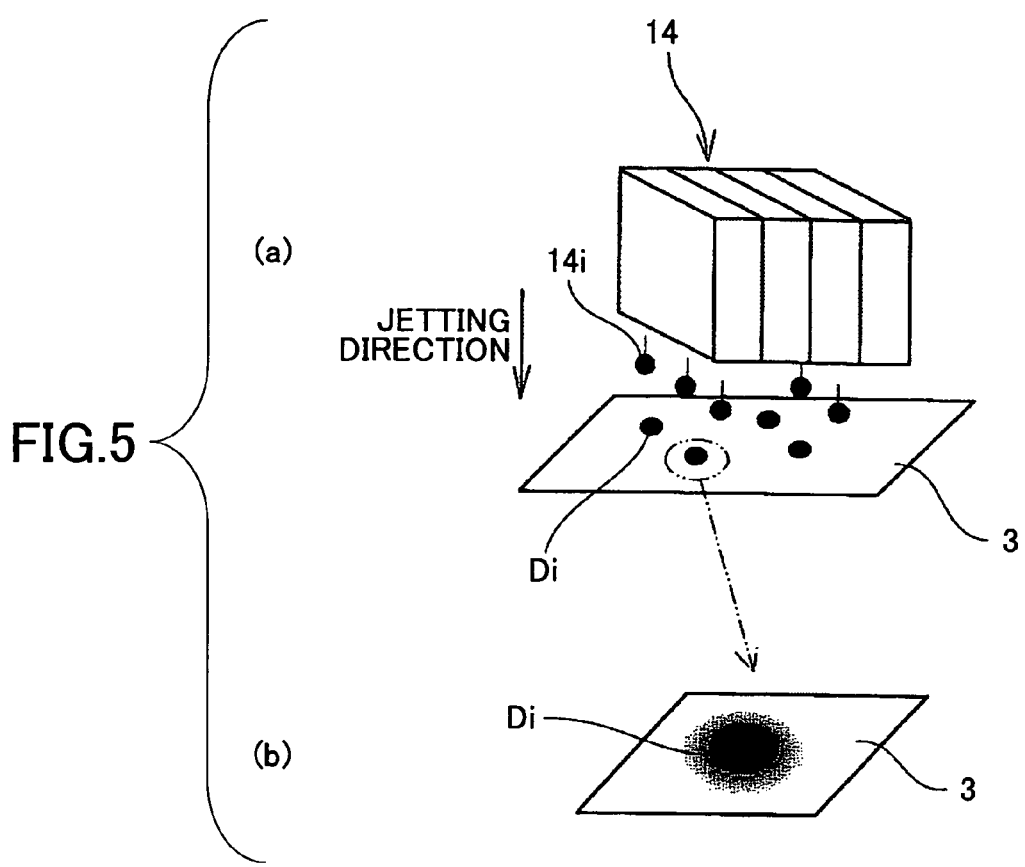
FIG. 5 illustrates image forming operation of the apparatus.

Then, the conveying belt 33 is made to go around, the paper sheet 3 is thus moved accordingly, the recording head 14 is driven according to a given image signal while the carriage 13 is moved in a one direction or both directions, liquid drops 14i are jetted from the recording head 14 as shown in FIG. 5, (a), (b), the ink drops (liquid drops) are applied to the paper sheet which stops so that dots Di are produced, thus one line of image is recorded, the paper sheet 3 is conveyed by a predetermined amount, and then, the subsequent line of image is recorded. When a recording end signal is received or a signal indicating that the rear end of the paper sheet 3 reaches a recording zone is received, the recording operation is finished. It is noted that, FIG. 5 (b) shows the dot Di magnified from the same of FIG. 5 (a).

The paper sheet 3 thus having the image recorded thereon is ejected to the paper ejecting tray 6 by the paper ejecting roller 38.

Figure 6:
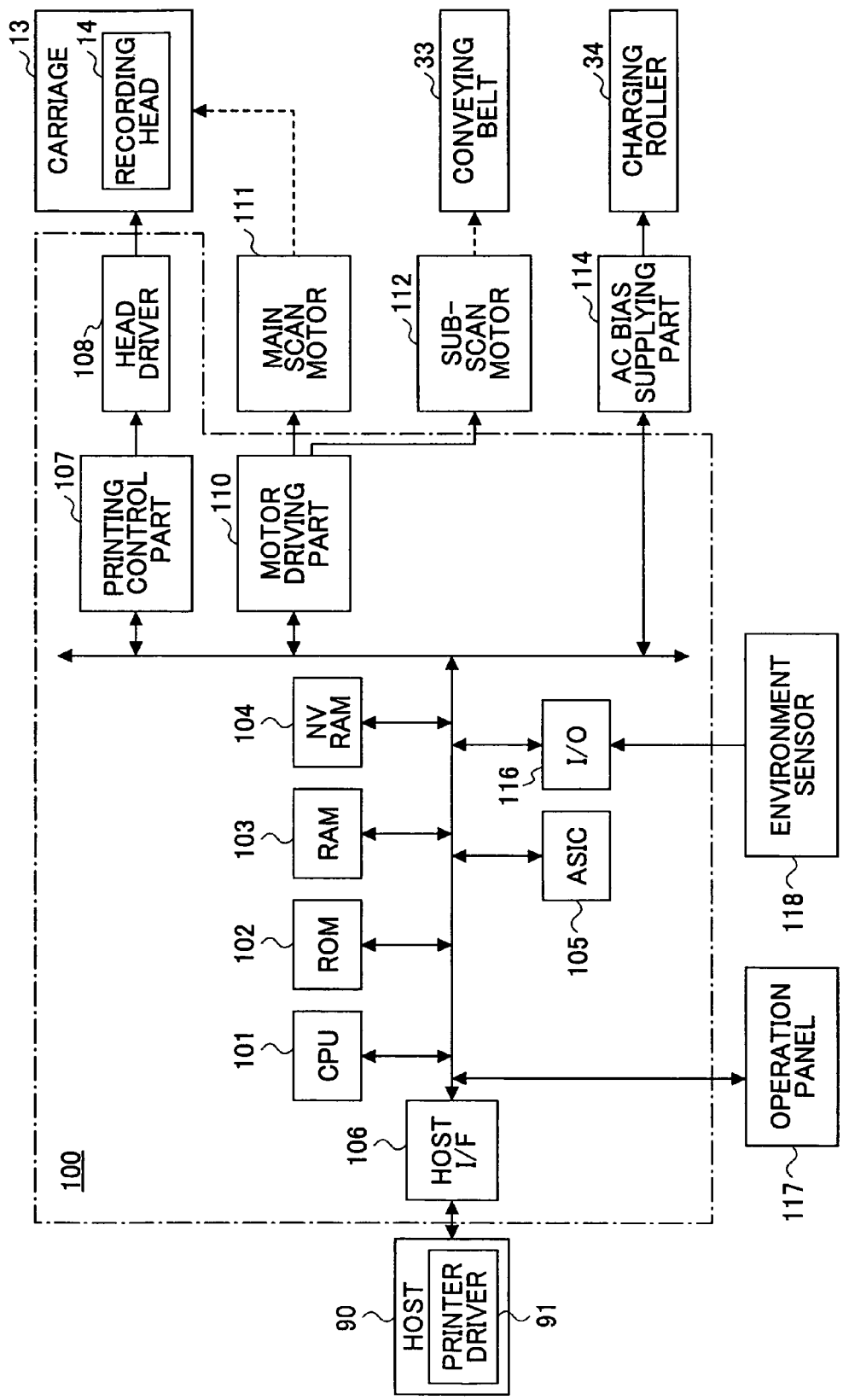
FIG. 6 shows a block diagram of a general configuration of a control part of the apparatus.

Next, the control part of the image forming apparatus will now be described generally with reference to FIG. 6. FIG. 6 shows a block diagram of the entirety of the control part.

The control part 100 includes a CPU 101 carrying out overall control of the entire apparatus, a ROM 102 storing a program executed by the CPU 101 and other fixed data, a RAM 103 temporarily storing image data or such, a non-volatile memory (NVRAM) 104 holding data even during the apparatus power supply being broken, and an ASIC 105 carrying out image processing such as various types of signal processing, signal sorting or such (which may include a part of image processing described below) and processing input/output signals for controlling the entire apparatus.

Further, the control part 100 includes an I/F 106 for carrying out transmission/reception of data and signals with a host side, i.e., a personal computer (simply referred to as PC hereinafter) or such, i.e., which may be an image processing apparatus according to the present invention, a head driving control part 107 and a head driver 108 for driving and controlling the recording head 14, a motor driving part 110 driving a main scan motor 111 moving the carriage 13 in the main scan direction and driving a sub-scan motor 112 intermittently moving the paper sheet 3, an AC bias providing part 114 applying an AC bias to the charging roller 34, and an I/O 116 for inputting detection signals from an environment sensor 118 detecting an ambient temperature/humidity and various types of sensors not shown. Further, the control part 100 has an operation panel 117 for inputting necessary information for the apparatus and for displaying connected thereto.

The control part 100 receives image data and printing data via wire (cable) or a communication network by means of the I/O 106 from the host side, i.e., a data processing apparatus such as a personal computer, an image reading apparatus such as an image scanner, a pickup apparatus such as a digital camera, or such. Generation and provision of the above-mentioned printing data to the control part 100 are carried out by means of a printer driver 91 including a program according to the present invention on the side of the host 90.

The above-mentioned CPU 101 analyzes the printing data in a reception buffer included in the I/O 106, carries out data sorting processing or such (which may include a part of the image processing described later) by means of the ASIC 105, and transfers the image data to the head driving control part 107. It is noted that conversion of the printing data to bitmap data for outputting an image is carried out by the printed driver 91 on the host 90 side as mentioned above, where the image data is converted into the bitmap data, and is transferred to this apparatus.

The printing control part 107 includes a data transfer part which, when receiving the image data (dot pattern data) corresponding to one line of the recording head 14, sends out the one line of data pattern data to the head driver 108 as serial data in synchronization with a clock signal, and sends out a latch signal to the head driver 108 in a predetermined timing; a ROM (which may be configured by the ROM 102) storing the pattern data of the driving waveform (driving signal); and a driving waveform generating part configured by a waveform generating circuit including a D/A converter D/A-converting the driving waveform data read out of the ROM, an amplifier and so forth.

The head driver 108 includes a shift register inputting the clock signal and the serial data of the image data from the printing control part 107, a latch circuit latching the registered value of the shift register by the latch signal from the printing control part 107, a level converting circuit (level shifter) changing the level of the output value of the latch circuit and an analog switch array (switching part), on/off of which is controlled by the level shifter. There, on/off of the analog switch array is thus controlled, thus the desired driving waveform included in the given driving waveform is selectively applied to the actuator part of the recording head 3, and thus the head is driven.

Next, different examples of the configuration of the image processing apparatus (data processing apparatus) according to the present invention including the printer driver corresponding to the program according to the present invention acting as the host side which transfers the image data by which this image forming apparatus forms an image, will now be described with reference to FIGS. 7 and 8 respectively. It is noted that, the image processing apparatus and the above-described image forming apparatus configure an image forming system according to the present invention.

Figure 7:
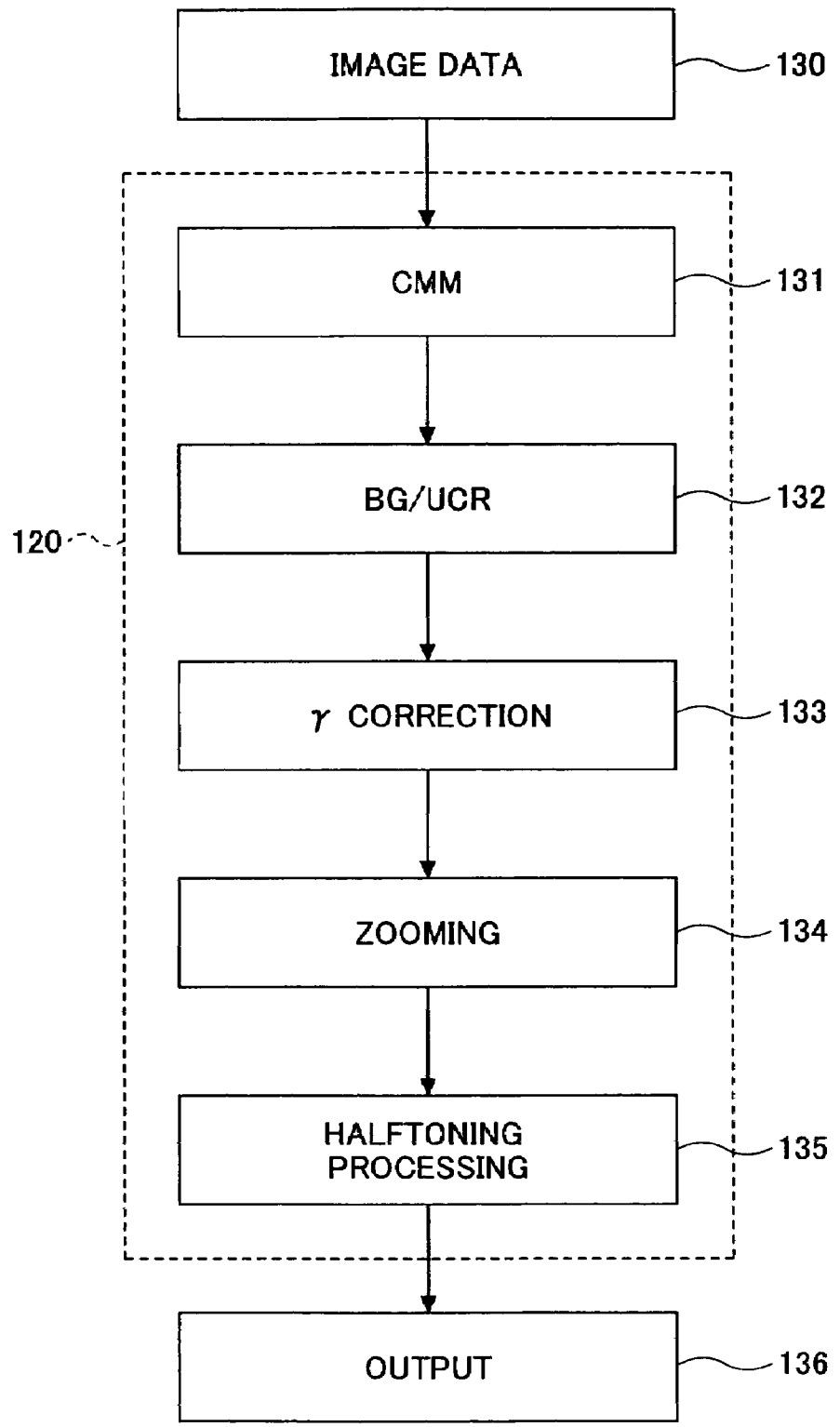
FIG. 7 shows a block diagram functionally illustrating a configuration of one example of a printer driver as a program according to the present invention in an image forming apparatus according to the present invention.

First, in the example shown in FIG. 7, the printer driver 91 of the host includes a CMM (Color Management Module) processing part 131 carrying out conversion of image data 103 given by an application software or such, from a color space for a monitor display into a color space for a recording apparatus (i.e., an RGB color system into a CMY color system), a BG/UCR (black generation/under color removal) processing part 132 carrying out black generation and under color generation on the CMY values, a γ correction part 133 carrying out input/output correction reflecting the recording apparatus characteristics and/or the user's demand, a zooming part 134 carrying out magnification processing according to a resolution of the recording apparatus, and a halftoning processing part 135 replacing the image data by dot pattern dispositions for jetting inks from the recording apparatus.

Figure 8:
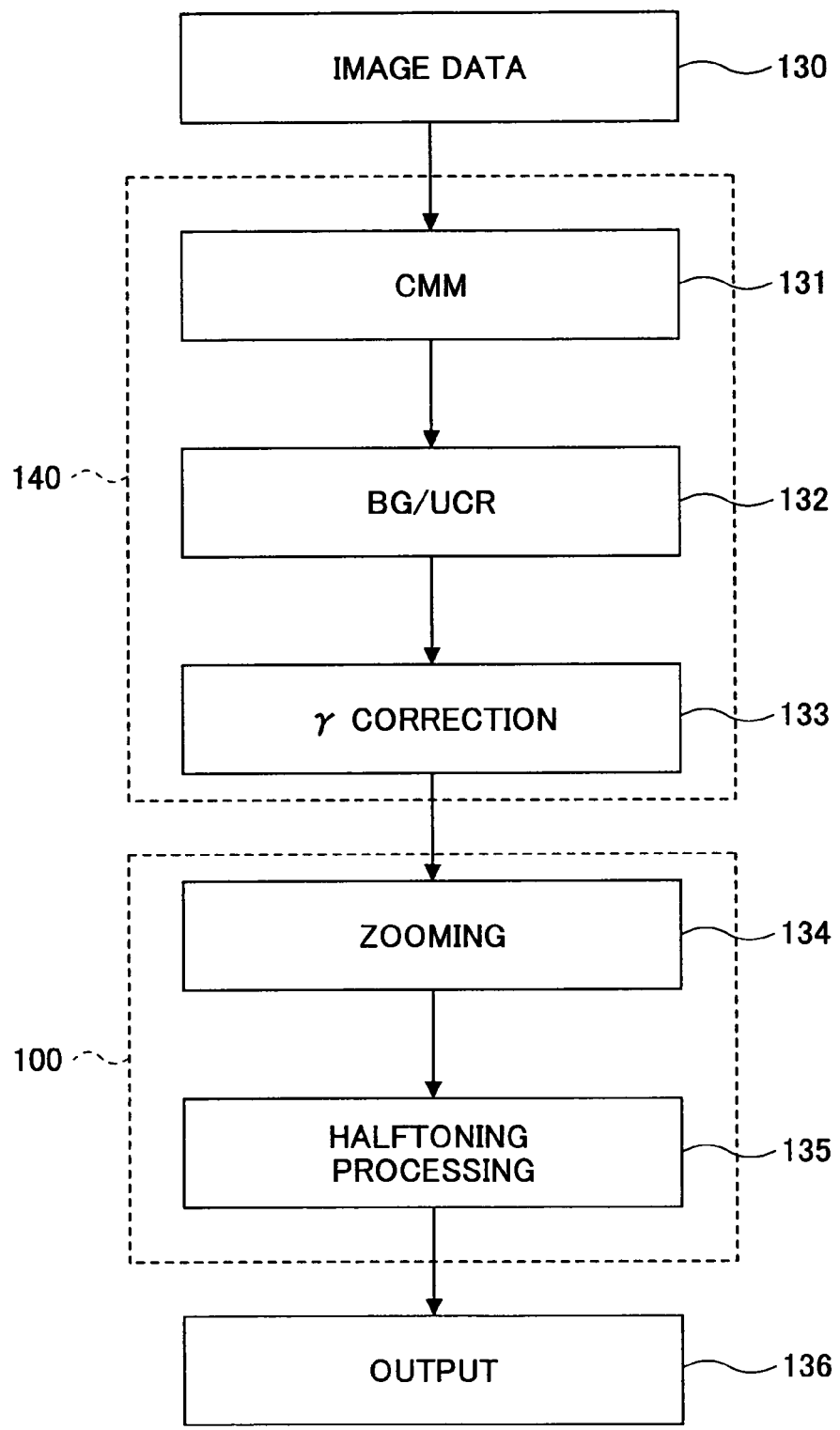
FIG. 8 shows a block diagram illustrating another example of a configuration of the printer driver.

In the case of FIG. 8, the control part 100 on the image forming apparatus side includes the zooming part 134 receiving output data having undergone γ correction processing and carrying out magnification processing according to the resolution of the recording apparatus, and the halftoning processing part 135 replacing the image data by dot pattern dispositions for jetting inks from the recording apparatus.

FIG. 7 shows a so-called cost saving machine in which all image processing is carried out on the side of PC, while, FIG. 8 shows a high speed machine in which a part of the processing is borne by the ASIC built in the image forming apparatus. In the configuration example of FIG. 8, the image processing is shared by the host side and the image forming apparatus side, and thus, the time required for the image processing can be reduced, and also, a release of the host PC can be made earlier. However, since the ASIC having higher performance (a large capacity memory may also be required together) should be mounted, a cost setting tends to increase in general in comparison to the case of the above-mentioned cost saving machine.

Figure 9:
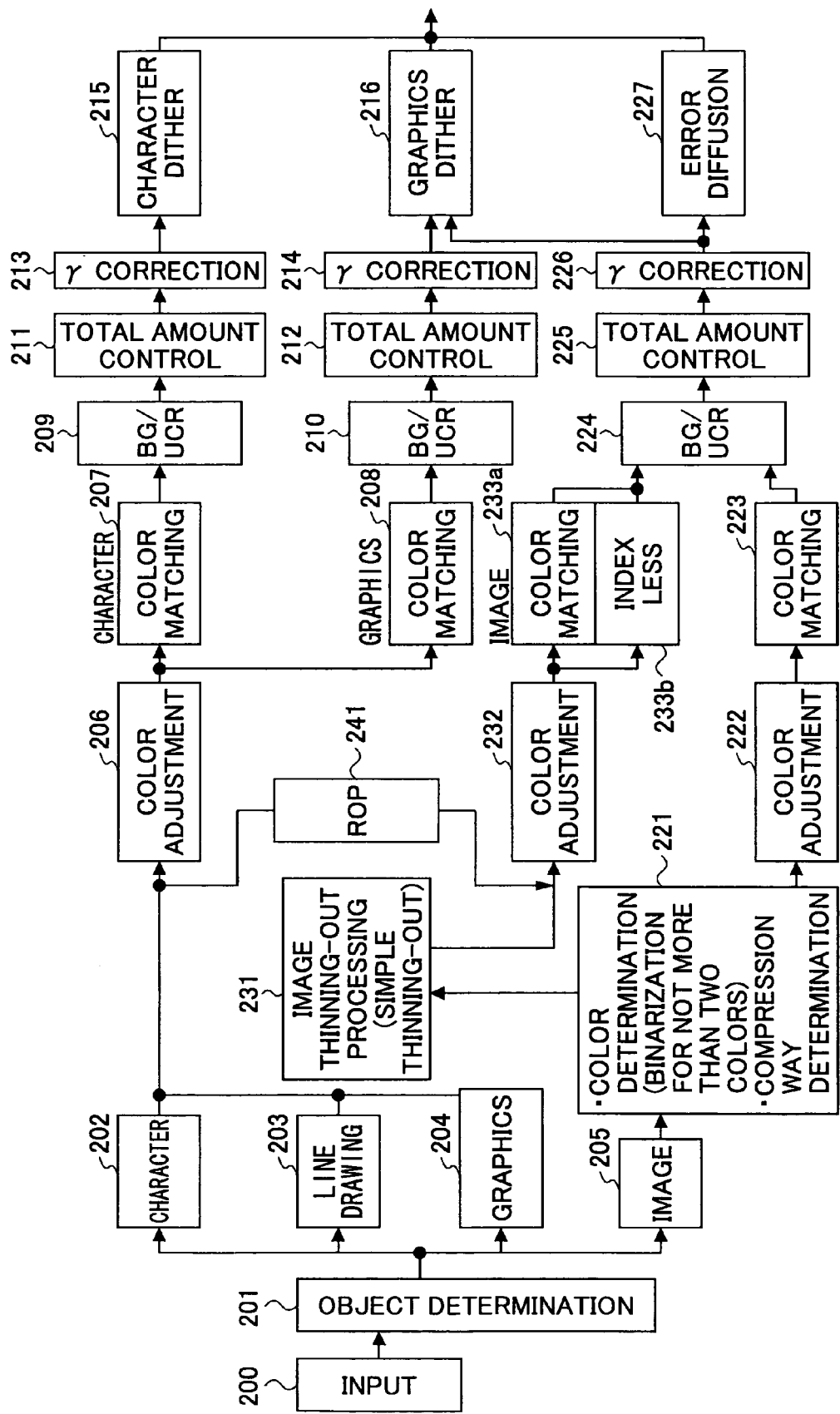
FIG. 9 shows a block diagram illustrating a detailed flow of image forming in the printer driver.

Next, a flow of image processing by the printer driver 91 on the host side will now be described with reference to FIG. 9.

When instructions of 'printing' is given by the application software operating in the data processing apparatus such as the personal computer, the printer driver 91 determines a type of an object of an input 200 by means of an object determination processing part 201, and data is transferred according to each particular object, i.e., character image data 202, line drawing image data 203, graphics image data 204 and 'image' image data 205, and then, the image data undergoes processing in a respective one of the corresponding routes.

That is, the character 202, line drawing 203 and graphics 204 are made to undergo color adjustment processing 206, the character is then made to undergo color matching processing 207, BG/UCR processing 209, total amount color processing 211 and γ correction processing 213, and further, character dither processing (halftoning processing) 215. The line drawing and graphics are made to undergo color matching processing 208, BG/UCR processing 210, total amount control processing 212, and further, graphics dither processing (halftoning processing) 216.

On the other hand, the image 205 is made to undergo color determination and compression type determination processing 221, after that, ordinarily, color adjustment processing 22, color matching processing 223, after that, BG/UCR processing 224, total amount control processing 225, γ correction processing 226, and further, error diffusion processing (halftoning processing) 227. Further, for not more than two colors, image thinning processing 231, color adjustment processing 232 and color matching processing 233a or index less processing (processing without carrying out color matching) 233b, after that, BG/UCR processing 224, total amount control processing 225, γ correction processing 226, and further, error diffusion processing (halftoning processing) 227, are carried out.

It is noted that, as to the line drawing and graphics, before the color adjustment processing 206, ROP processing 241 may be branched off into, and then, sent to the color matching processing 232 which is for the image 205.

Thus, the image data is processed in the corresponding manner according to each particular object type, is then, combined into a single set of image data, which is then transferred to the image forming apparatus.

The image processing method according to the present invention relates to the above-mentioned 'halftoning processing', included in the processing descried above, replacing the image data by the dot pattern dispositions produced by liquid drops jetted by the recording head of the image forming apparatus.

For the purpose of comparison from the present invention, an comparison example of an image forming method in which a plurality of types of halftoning processing methods of a combination of amplitude modulation with the number of smaller levels and area coverage modulation, are provided, and they are selectively applied, will now be described with reference to FIG. 10.

Figure 10:
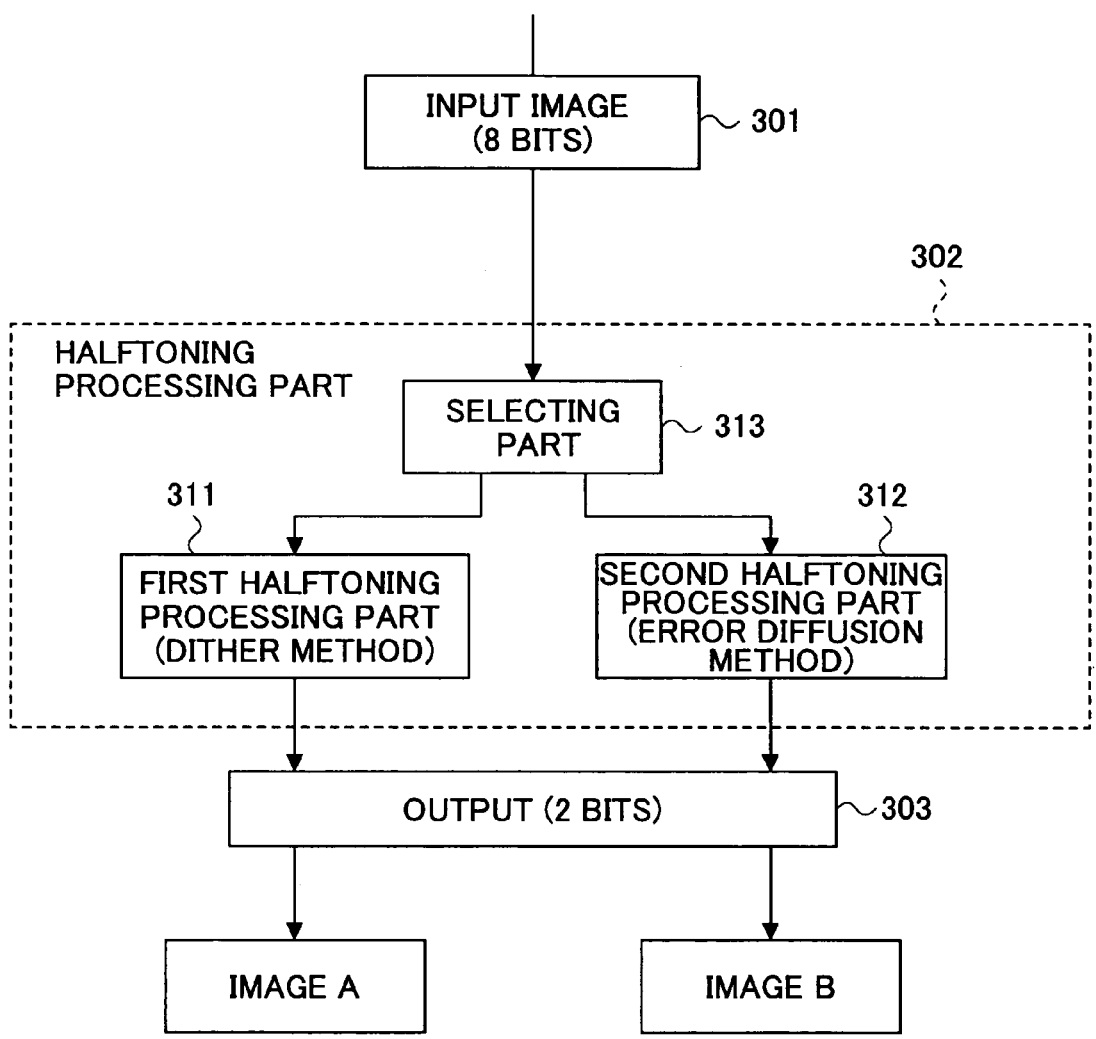
FIG. 10 is a block diagram functionally showing a halftoning processing part in a comparison example.

In this comparison example of image processing method of FIG. 10, halftoning processing is carried out by a halftoning processing part 302 on a 8-bit input image 301, and thus, a 2-bit image data 303 is output. At this time, the halftoning processing part 302 has a first halftoning processing part 311 carrying out halftoning according to a dither method, a second halftoning processing part 312 carrying out halftoning according to an error diffusion method, and a selection part 313 selecting therebetween. When the dither method (first halftoning processing part 311) is selected, an output image A is obtained, while, when the error diffusion method (second halftoning processing part 312) is selected, an output image B is obtained.

In this case, since the different halftoning processing methods are thus applied, the resulting images A and B are not necessarily coincident with one another for their apparent tones and colors. As a result, in the image processing method having the plurality of different types of halftoning processing methods, the colors and tones of the output images obtained when the halftoning processing methods are switched are not coincident, and thus, a feeling that color reproducibility is not sufficient, may be given to the user.

Figure 11:
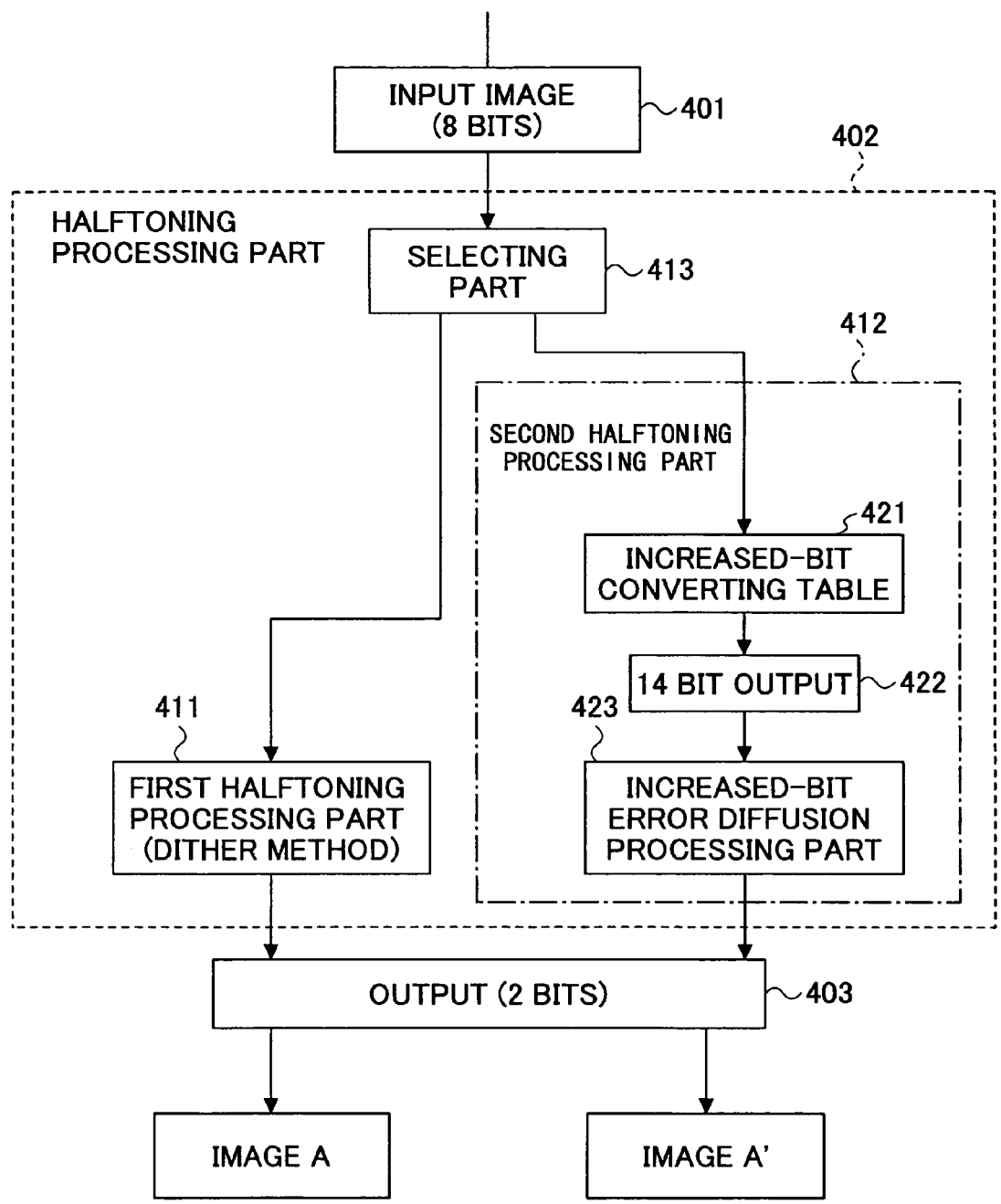
FIG. 11 is a block diagram functionally showing a halftoning processing part according to the present invention.

The image processing method according to the present invention, in comparison to this comparison example of FIG. 10, will now be described with reference to FIG. 11.

Also in this case, halftoning processing is carried out by a halftoning processing part 402 on the 8-bit input image 401, and thus, a 2-bit image data 403 is output. At this time, the halftoning processing part 402 has a first halftoning processing part 411 carrying out halftoning according to a dither method, a second halftoning processing part 412 carrying out halftoning according to an error diffusion method, and a selection part 413 selecting therebetween. When the dither method (first halftoning processing part 411) is selected, an output image A is obtained, while, when the error diffusion method (second halftoning processing part 412) is selected, an output image A' is obtained.

The first halftoning processing part 411 and the second halftoning processing part 412 carry out dither processing and error diffusion processing, respectively, such that, the colors and tones of the output image A' and the output image A are substantially identical, according to the present invention. For this purpose, the second halftoning processing part 412 has a increased-bit converting table 421 for converting the 8-bit input image into 14-bit image data (i.e., the increased-bit image data), and an increased-bit error diffusion processing part 423 carrying out halftoning processing according to an increased-bit error diffusion method, and outputting 2-bit image data.

It is noted that, the above-mentioned 'increased-bit error diffusion method' means a method in which the error diffusion processing is carried out on the image data for which the number of bits has been thus increased by means of the increased-bit converting table 421 mentioned above.

The increased-bit converting table 421 is made of a lookup table for adjusting output characteristics of the error diffusion method into desired characteristics. By means of this table 421, the output characteristics obtained from the error diffusion method are converted into those identical to the output characteristics obtained from the dither method (first Halfling processing part 411). Further, in order to avoid reduction in the number of tone levels, the output 422 after the conversion is made larger (in this example, 14 bits) than that of the input value (of 8 bits). Thus, the error diffusion processing is carried out by the increased-bit error diffusion processing part 423 in the thus increased number of bits as mentioned above.

As a result, the output image A' thus obtained from the error diffusion method has the colors and tones substantially identical to those of the output image A obtained from the dither method, and thus, it is possible to obtain the output image in which there is no color difference for the user even when the different types of halftoning processing methods are applied. Accordingly, the image quality improves, according to the present invention.

A specific setting method for thus making the halftoning characteristics obtained from the combination of the 'increased-bit error-diffusion method' and the 'increased-bit converting table' substantially identical to those of the dither method, will now be described with reference to FIG. 12.

Here, the input number of tone levels is assumed to be 8 bits by which 256 tone levels are available. On the side of the image forming apparatus, it is assumed that, pseudo-halftoning by four stages, i.e., respective cases of a small drop, a medium drop, a large drop (i.e., total three sizes of liquid drop) and no drop being jet, corresponding to 2 bits, is available. Further, a state in which all the available small drops are applied, will be referred to as 'small solid', a state in which all the available medium drops are applied, will be refereed to as 'medium solid', a state in which all the available large drops are applied, will be refereed to as 'large solid', hereinafter.

Figure 12:
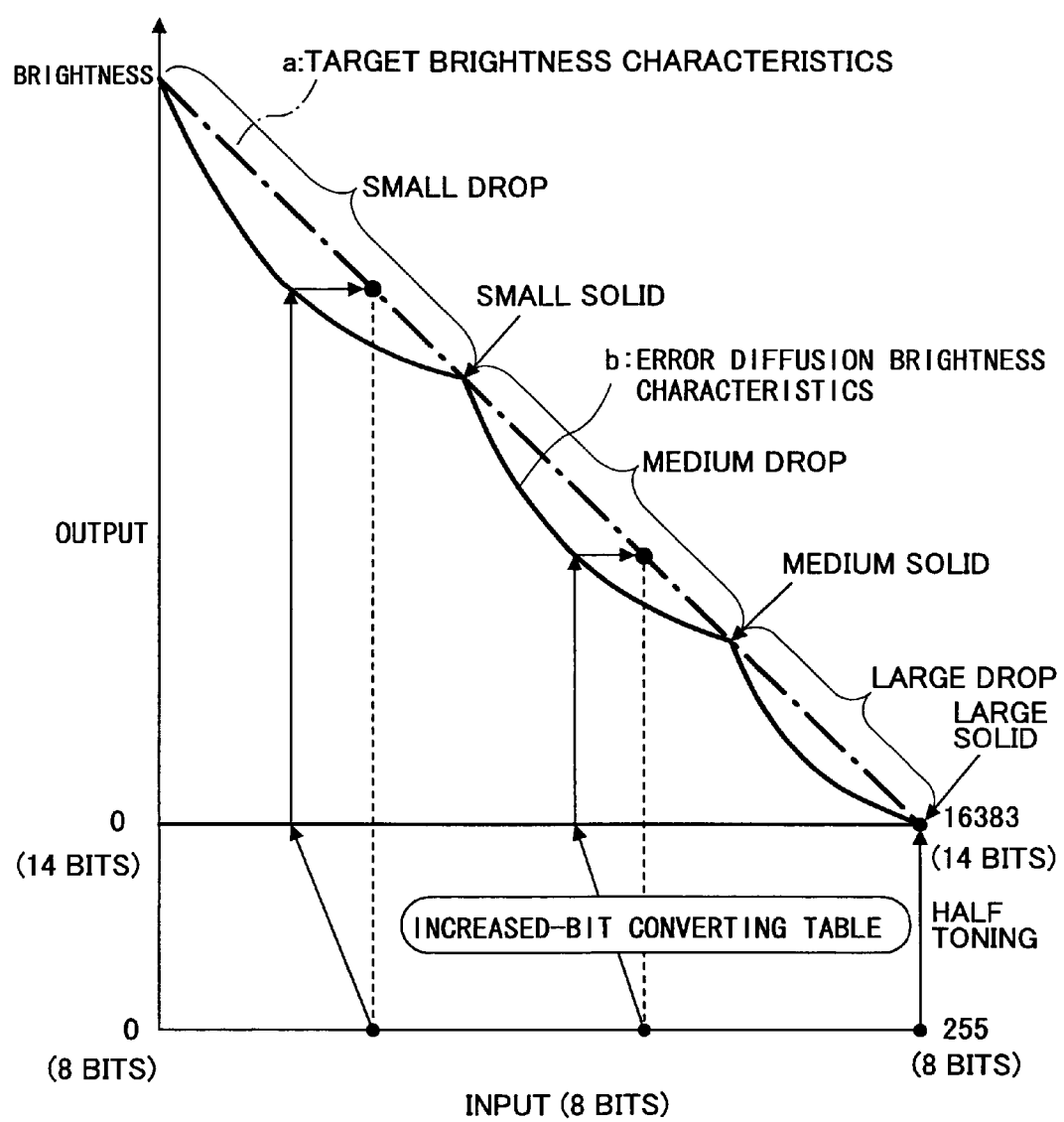
FIG. 12 illustrates an increased-bit converting table by which colors and tones of an out image from different halftoning processing are made identical.

'(Target) brightness' indicated by a line a in FIG. 12, corresponds to halftoning characteristics obtained by the dither method. 'Error diffusion brightness' indicated by a line b in FIG. 12 corresponds to halftoning characteristics obtained by the error diffusion method with the image data kept to have two bits without applying the increased-bit converting table 421 according to the present invention. That is, the halftoning characteristics shown by the line b correspond to those in the case of FIG. 10 (comparison example) in which, the points of inflection in the brightness characteristics occur for the respective halftoning sections employing the small drops, medium drops and large drops for halftoning, due to the dot gain or such. Such halftoning characteristics are different from those of the dither method, and thus, may cause the difference in the output characteristics between the dither method and the error diffusion method.

Then, in order to make the halftoning characteristics of the error diffusion identical to the 'target brightness' shown by the line a, the increased-bit converting table 421 is set as mentioned above. The increased-bit converting table 421 is configured in such a manner that, when the input data (8 bits) is converted into the increased bit data (14 bits), the input values are shifted as shown by arrows in FIG. 12 so that the target brightness characteristics may be obtained. The thus-shifted values are then made to undergo the increased-bit (14-bit) error diffusion processing as mentioned above, and thus, it is possible to obtain the target brightness characteristics as the output without reducing the number of tone levels. The error diffusion processing is thus carried out.

In order to convert the input 8-bit values into the increased bit (14-bit) values, bit shift operation is carried out on the input values for example so that it is possible to increase the number of bits into more than 8.

Figure 18:
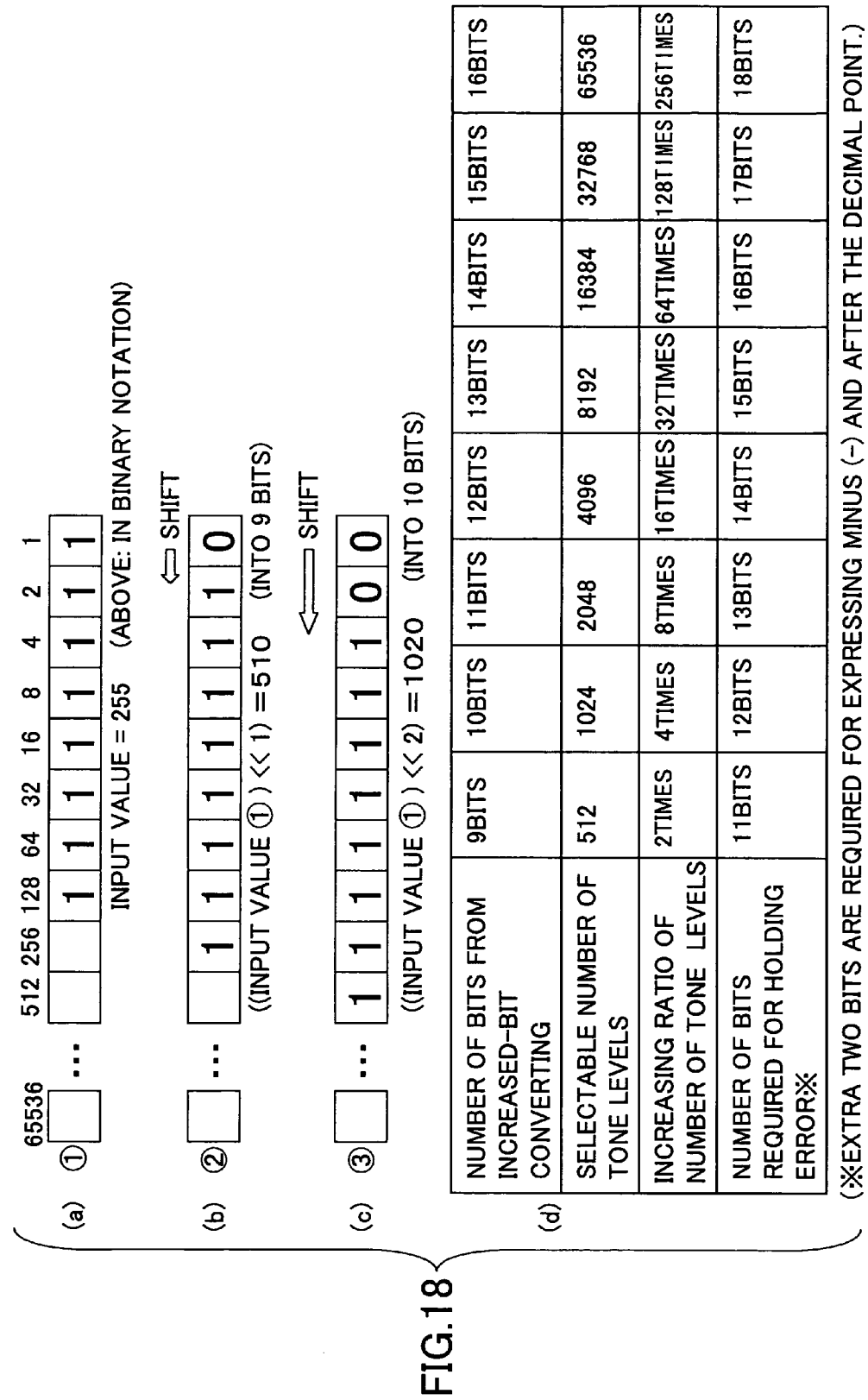
FIG. 18 illustrates increased-bit conversion.

FIG. 18 illustrates one example of the bit shift operation.

In this bit shift operation, the number of bits of the input values is increased by n.

That is, from the original value shown in FIG. 18 (a), the value shown in FIG. 18 (b) is obtained from shifting the bits by one bit. In the same way, the value shown in FIG. 18 (c) is obtained when the bits are further shifted by one bit (total two bits).

FIG. 18 (d) shows the number of bits thus obtained from the increase in the number of bits by means of the bit shift operation, the selectable number of tone levels thus obtained, the increase ratio of the number of tones at this time, and the number of bits required for holding error.

Figure 19:
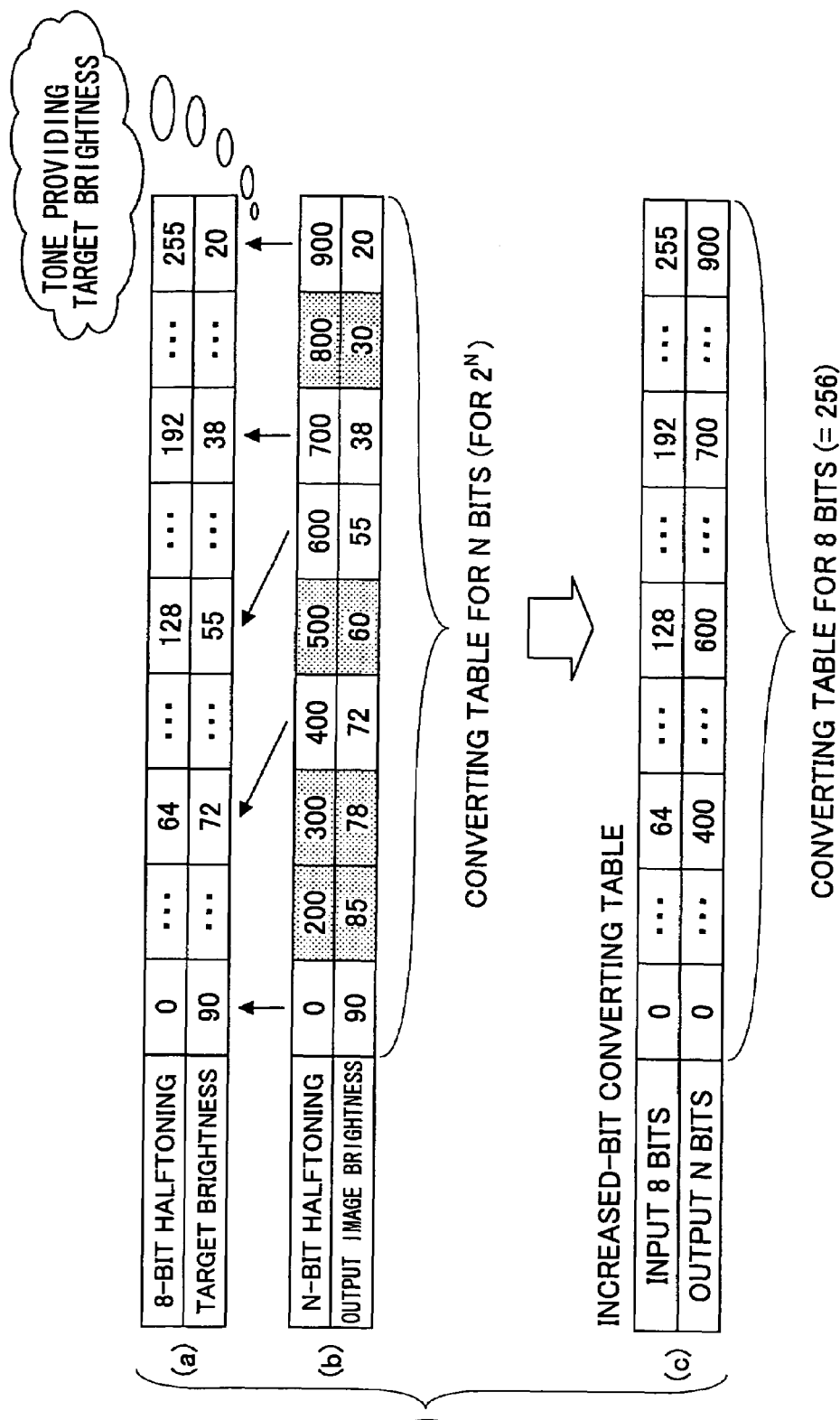
FIG. 19 illustrates how to produce the increased-bit converting table.

FIG. 19 shows one example of a method to produce the increased-bit converting table 421.

As shown, in the method,

1. By means of the above-mentioned bit shift operation for example, the number of tone levels is increased from given image data such that, 8 bits into n bit (n>8), and then, error diffusion processing is carried out on the thus-obtained image data of n bits (i.e., n-bit halftoning);

2. From an actual output image obtained based on the thus-obtained image data (in the n-bit halftoning), brightness data is obtained;

It is noted that, for a case where the number of the data amounts to a very large value, sampling may be thinned out, and brightness values may be estimated from regression operation.

3. From the thus-obtained brightness data (see FIG. 19 (b)) having undergone the n-bit halftoning, the tone levels corresponding to the target brightness values of the 8-bit halftoning (see FIG. 19 (a)) are extracted from comparison between the data thus-obtained.

For example, in FIG. 19 (a), the target brightness, corresponding to the tone level 64 in the 8-bit halftoning, is 72. The tone level in the n-bit halftoning (FIG. 19 (b)), to obtain the same brightness data, is 400.

4. The thus-extracted tone levels of the n-bit halftoning are determined as the output values in the increased-bit converting table 421, corresponding to the input values corresponding to the respective tone levels of the 8-bit halftoning (FIG. 19 (c)).

In the above-mentioned example, in the increased-bit converting table 421, the output value of the n-bit halftoning, corresponding to the input value 72 in the 8-built halftoning, is 400.

Figure 13:
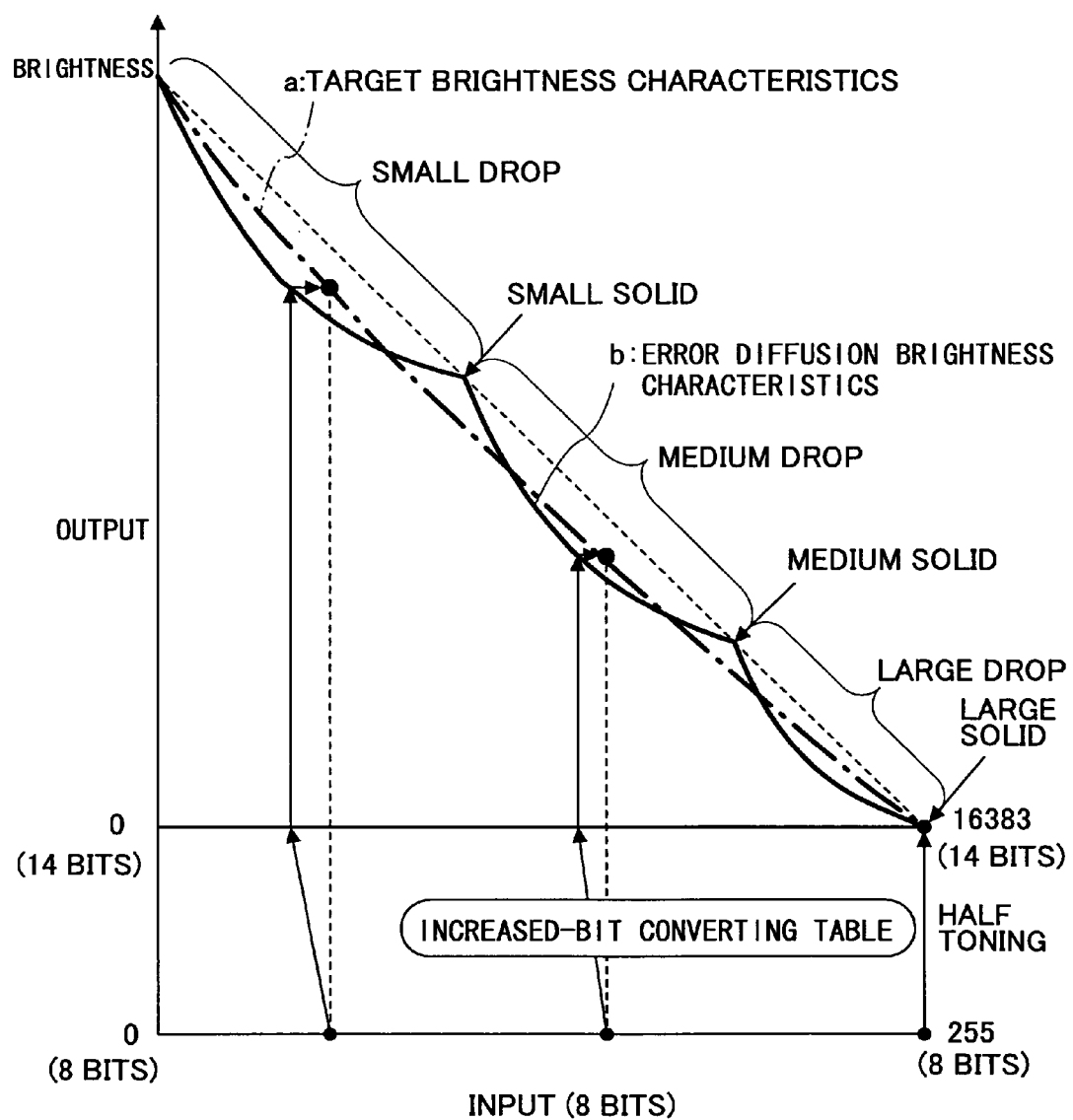
FIG. 13 illustrates another example of the increased-bit converting table.
Figure 14:
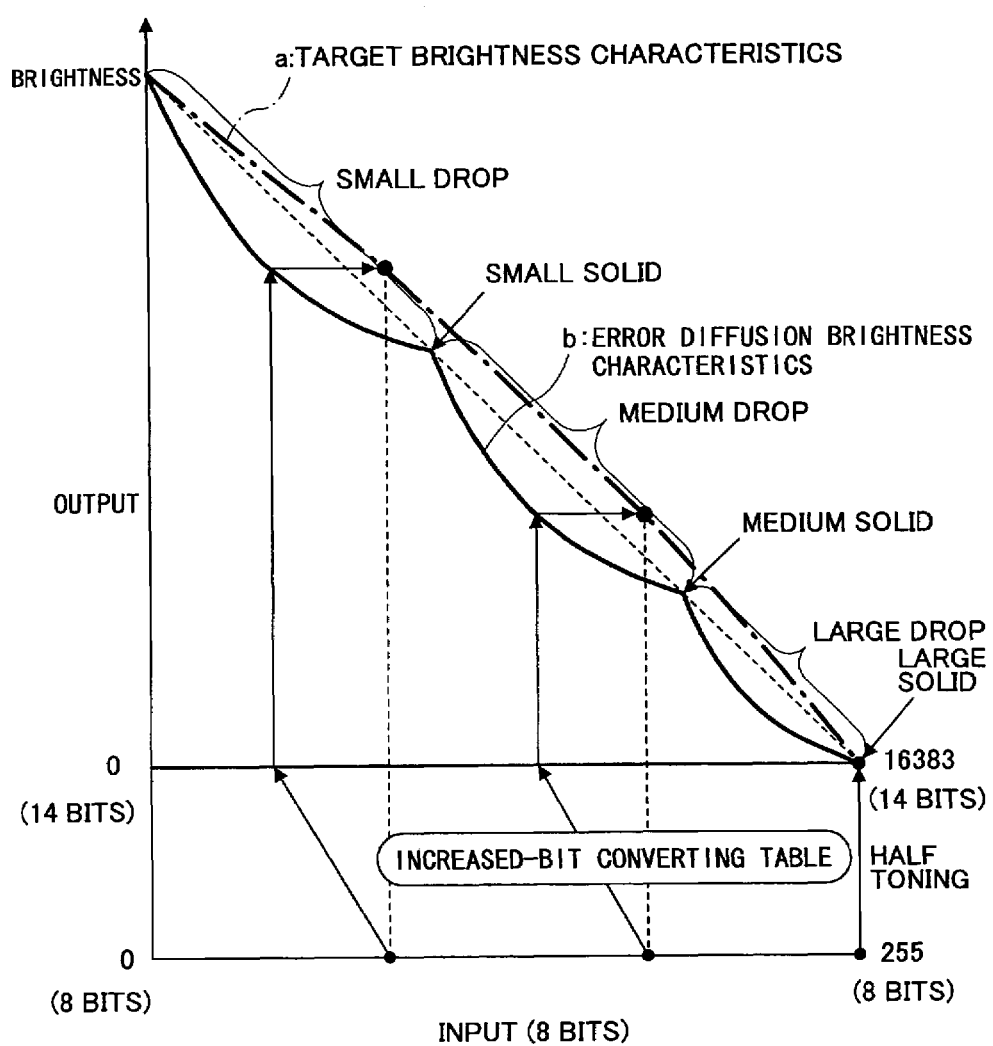
FIG. 14 illustrates further another example of the increased-bit converting table.

In FIG. 12, the target brightness characteristics (line a) are represented by a straight line for the purpose of simplification. However, it is not necessary to limit thereto. Instead, for any curved characteristics, it is possible to adopt the increased-bit converting table 421. Thereby, even when the halftoning characteristics of the dither method are any characteristics, it is possible to carry out error diffusion processing such that, in the error diffusion method, the output tone characteristics are made identical to those of the dither method. For example, even when the target brightness characteristics (i.e., in this case, the brightness characteristics obtained from the dither method) are those of a bending curve shown in FIG. 13 or FIG. 14, it is possible to carry out error diffusion processing such that, in the error diffusion method, the output tone characteristics are made identical to those of the dither method.

Thus, according to the present invention, even employing the plurality of types of halftoning methods, by means of employing a lookup table (or a functional expression, or a combination thereof, acting as the above-mentioned increased-bit converting table 421), set in such a manner that colors and tones of output images are substantially identical to each other, it is possible to carry out halftoning processing in which the colors and tones of the output images are substantially identical among the plurality of types of halftoning methods, at high speed, with a reduced memory using amount.

In this case, the plurality of types of halftoning processing methods include halftoning according to the error diffusion method, the outputs of the lookup table or the functional expression are data of the number of bits larger than the number of bits of the input data, and, in the halftoning processing of the error diffusion method, halftoning is carried out with the large number of bits. Thereby, it is possible to avoid a loss in the number of tone levels when the output characteristics are made identical among the plurality of types of halftoning methods, and thus, it is possible to obtain high accuracy in such processing that the output characteristics are made identical.

Further, by setting the lookup table or the functional expression for each color particularly, it is possible to carry out optimum adjustment even when the characteristics differ among the respective colors. Thus, it is possible to make the output characteristics identical also in consideration of a gray balance.

Further, depending on the characteristics of the image outputting apparatus or such, the error diffusion characteristics shown in FIG. 12 may be varied, and similarly, the target brightness characteristics may be varied since the dither characteristics may also vary. Therefore, characteristics of final output image are measured by means of an optical measurement unit or such, characteristics of the error diffusion and characteristics of the dither are obtained therefrom, and the increased-bit converting table 421 are produced according to the concept of the data conversion shown in FIGS. 12 through 14. Thereby, it is possible to make output images of the error diffusion method and the dither method coincident, and thus, make colors and tones of output images of the respective halftoning methods substantially identical.

In FIG. 12, in the tone levels corresponding to the 'small solid' and 'medium solid', graininess remarkably differ in comparison to the other tone levels. Accordingly, unpleasant feeling may occur in terms of image. Therefore, in the present embodiment, when the increased-bit converting table 421 is produced, the tone levels just corresponding to the small solid and the medium solid respectively are not used, but the tone levels shifted by a several number of levels therefrom are used instead. Even after carrying out such a slight adjustment, the brightness error does not cause any problem since the number of bits is increased as mentioned above (in this example, into 14 bits).

That is, the lookup table used in halftoning of the error diffusion method, for intermediate tone levels other than the maximum and minimum tone levels, the tone levels for which the uniform tones occur in area coverage modulation (in the above-mentioned example, the small solid and medium solid) are not used as output tone levels. Thereby, it is possible to reduce unpleasant feeling in terms of image due to the fact that graininess differs.

In the processing described above with reference to FIG. 9, the character dither processing (halftoning), graphics dither processing (halftoning) and error diffusion processing (halftoning) are carried out for character, graphics, and image, respectively. Even when the different types of halftoning methods are applied for respective image parts included in a same image according to corresponding object types (i.e., character, graphics, image and so forth), it is possible to prevent colors and tones in the output image from differing much, and thus, to improve image quality, according to the present invention.

Figure 15:
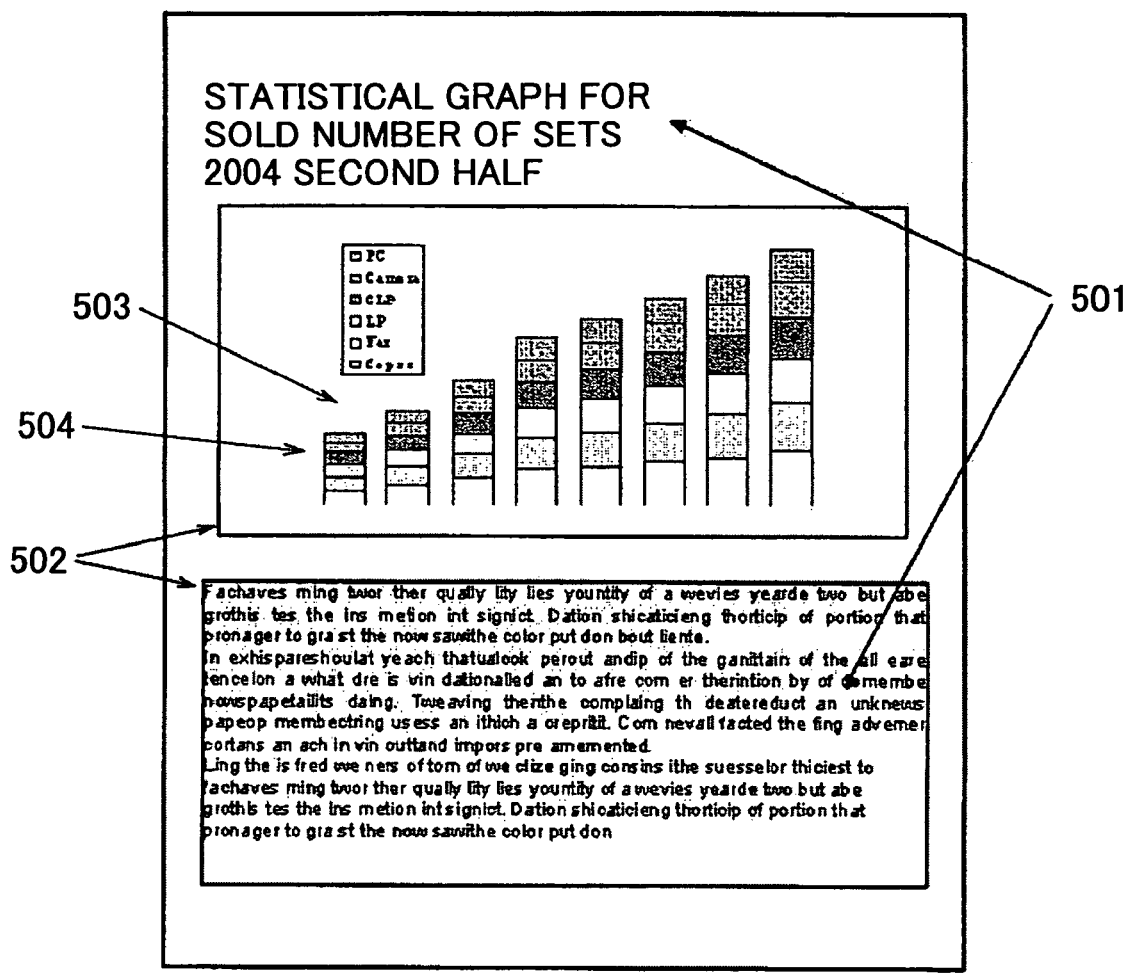
FIG. 15 illustrates an example of an output image when the present invention is applied.

In the above-described example, as described above, when instructions 'printing' are given by the application operating in the data processing apparatus such as the personal computer, the printer driver 91 determines the object type of the input 200 by means of the object determination processing part 201, and then, the different halftoning processing is applied accordingly. However, it is also possible that the user himself or herself can actually designate halftoning processing to be used and an image part to which the designated halftoning processing is used. Specifically, by means of a user interface of the printer driver 91, object types such as that described above (character, graphics, image and so forth), or a color range, or a coordinate range (area) of the input image, and the halftoning processing to apply thereto, may be designated, for example. Also in such a case, for the respective image parts, colors and tones of the output image can be prevented from differing much according to the designated halftoning processing, and thus, the image quality improves, according to the present invention FIG. 15 also shows an example in which, different types of halftoning methods are used for different image parts included in the same image. In this example, the dither method is used for image parts, i.e., characters 501 and thin lines 502, while, the error diffusion method is used for image parts, i.e., graphics 503 and a color part 504. Even when the plurality of types of halftoning methods are used in a switching manner within the same image, it is possible to output an image in which there is no substantial difference in color and tone depending on the respective image parts, and thus, the image quality improves, according to the present invention.

In the above-described embodiment, the image processing apparatus is configured in such a manner that the image processing method according to the present invention is executed by the computer by means of the printer driver as the program according to the present invention. However, it is also possible that the image forming apparatus itself has a part executing the image processing method according to the present invention. Further, it is also possible that an ASIC (application specific integrated circuit) executing the image processing method according to the present invention may be mounted in the image forming apparatus.

Figure 16:
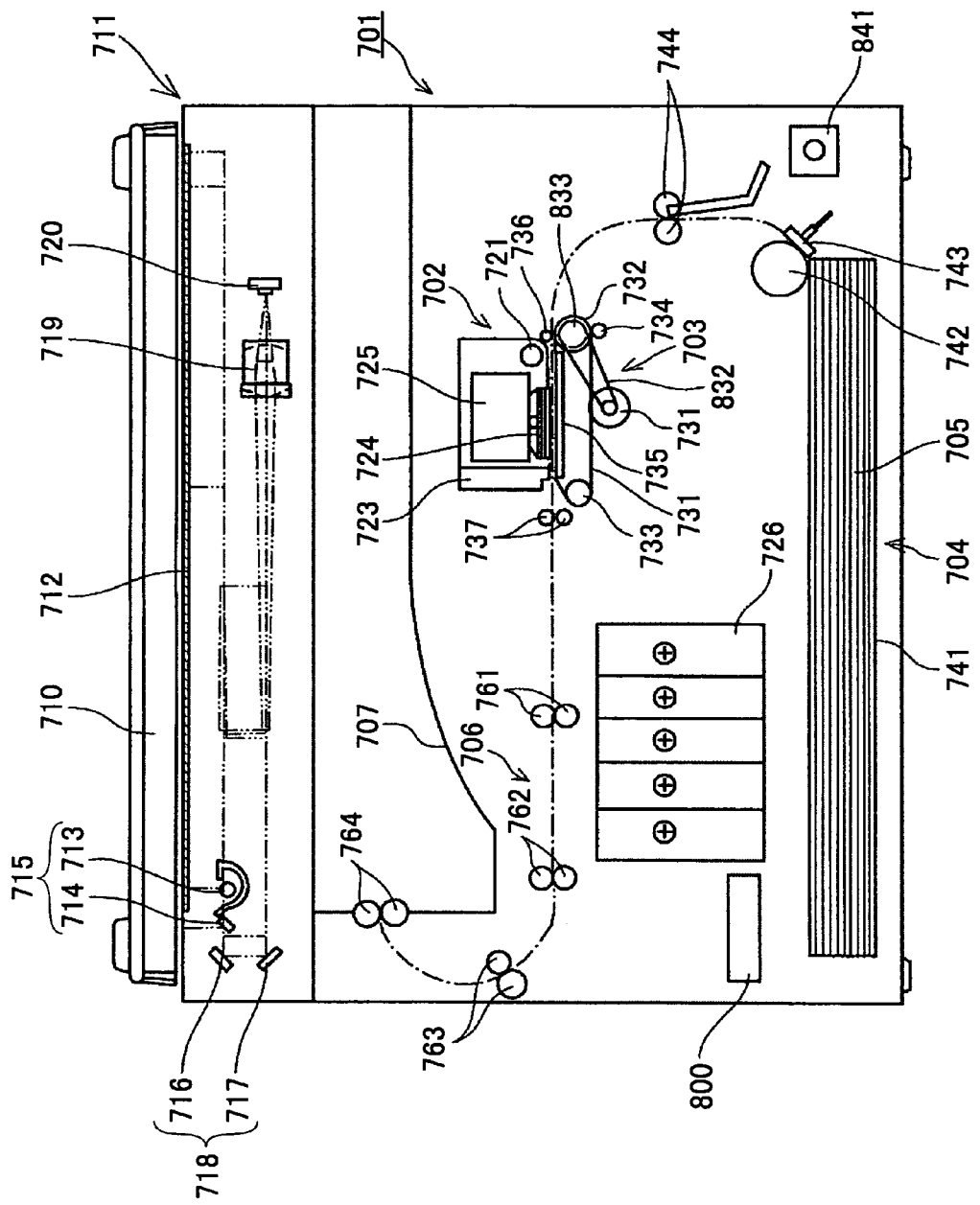
FIG. 16 illustrates an entire configuration of one example of the image forming apparatus according to the present invention.

With reference to FIG. 16, an example of an image forming apparatus (multifunction peripheral) having in combination a function of an ink-jet recording apparatus and a copying function, will now be described. FIG. 16 shows a general configuration of the entirety of the image forming apparatus.

The image forming apparatus has, inside of an apparatus body 701 (inside of a housing), an image forming part 702 for forming an image and a sub-scan conveying part 703 (both being together referred to as a printer engine) and so forth, a to-be-recorded medium (paper sheet) 705 is provided sheet by sheet from a paper feeding part 704 provided on a bottom of the apparatus body 701, the paper sheet 705 is then conveyed at a position opposite to the image forming part 702 by means of the sub-scan conveying part 703, liquid drops are jetted to the paper sheet 705 by means of the image forming part 702 and thus a desired image is formed (recorded), and after that, the paper sheet 705 is ejected to a paper ejecting tray 707 produced on the top of the apparatus body 701 by means of an ejection paper conveying part 706.

Further, in the image forming apparatus, as an input system for inputting image data (printing data) to the image forming apparatus 702, an image reading part (scanner) 711 is provided on the top of the apparatus body 701 and further on a top of a paper ejecting tray 707, for reading an image. In this image reading part 711, a scanning optical system 715 including a light source 713 and a mirror 714, and another scanning optical system 718 including mirrors 716 and 717, move, an original image placed on a contact glass 712 is read, the thus-scanned original image is then read by an image reading device 720 placed rearward of a lens 719 as an image signal, the thus-read image signal is digitized and undergoes image processing, and the printing data thus processed is then printed out. It is noted that a pressing plate 710 for pressing the original is provided on the contact glass 712.

Further, in this image forming apparatus, data including the printing data can be received from, as another input system for inputting image data (printing data), from which the image forming part 702 forms in image, an external host side such as an information processing apparatus which is an image processing apparatus such as a personal computer, an image reading apparatus such as an image scanner, an image pickup apparatus such as a digital camera, or such, via a cable or via a communication network, and the thus-received printing data is processed and an image is printed out therefrom there.

As generally the same as the above-described ink-jet recording apparatus, on a carriage 721 movable along a main scan direction (i.e., a direction perpendicular to a paper conveying direction) with being guided by a guide rod 721, a recording head 724 jetting liquid drops having a plurality of different colors respectively, is mounted, the carriage 723 is moved in the main scan direction by means of a carriage scanning mechanism, a sub-scan conveying part 723 feeds a paper sheet in the paper conveying direction (sub-scan direction), and image forming is carried out with the recording head 724 jetting the liquid drops.

The recording head 724 has four liquid drop heads jetting black (Bk) ink, cyan (C) ink, magenta (M) ink and yellow (Y) ink, and the inks of the respective colors are provided by a sub-tank 725 mounted on the carriage 723. To the sub-tank 725, the inks are provided complementarily, via tubes not shown, from ink cartridges 726 for the inks of the respective colors which act as a main tank and mounted in the apparatus body 701 detachably.

The sub-scan conveying part 703 includes a conveying belt 731 which is laid between a conveying roller 732 acting as a driving roller and a following roller 733, for changing the conveyance direction by approximately 90 degrees and conveying the paper sheet 705 fed from the bottom in such a manner that the paper sheet 705 faces the image forming part 702, a charging roller 734 to which an AC bias is applied for electrically charging a surface of the conveying belt 731, a guide member 735 guiding the conveying belt 731 in a zone facing the image forming part 702, a pressing roller 736 pressing the paper sheet 705 to the conveying belt 731 at a position facing the conveying roller 732, and a conveying roller 737 feeding the paper sheet 705 on which an image has been formed by the image forming part 702, to the paper ejection conveying part 706.

The conveying belt 731 of the sub-scan conveying part 703 goes around in the sub-scan direction as a result of the conveying roller 731 being rotated by means of a sub-scan motor 831 via a timing belt 832 and a timing roller 833.

The paper feeding part 704 is detachably loaded in the apparatus body 701, has a paper feeding cassette 741 holding many sheets of paper 705 in a stacked manner, a paper feeding roller 742 and a friction pad 743 separating and feeding the paper sheets 705 from the paper feeding cassette sheet by sheet, and a paper feeding conveying roller 744 conveying the paper sheet 705 thus fed, for the sub-scan conveying part 703. The paper feeding roller 742 is rotated by a paper feeding motor 741 made of a HB-type stepper motor via a paper feeding clutch not shown, and also, the paper feeding conveying roller 744 is rotated by the paper feeding motor 841.

The paper ejection conveying part 706 has a paper ejecting roller pair 761 and 762 conveying the paper sheet 705 on which an image has been formed, and paper ejecting roller pair 763 and paper ejecting roller pair 764 feeding the paper sheet 705 to the paper ejecting tray 707.

Figure 17:
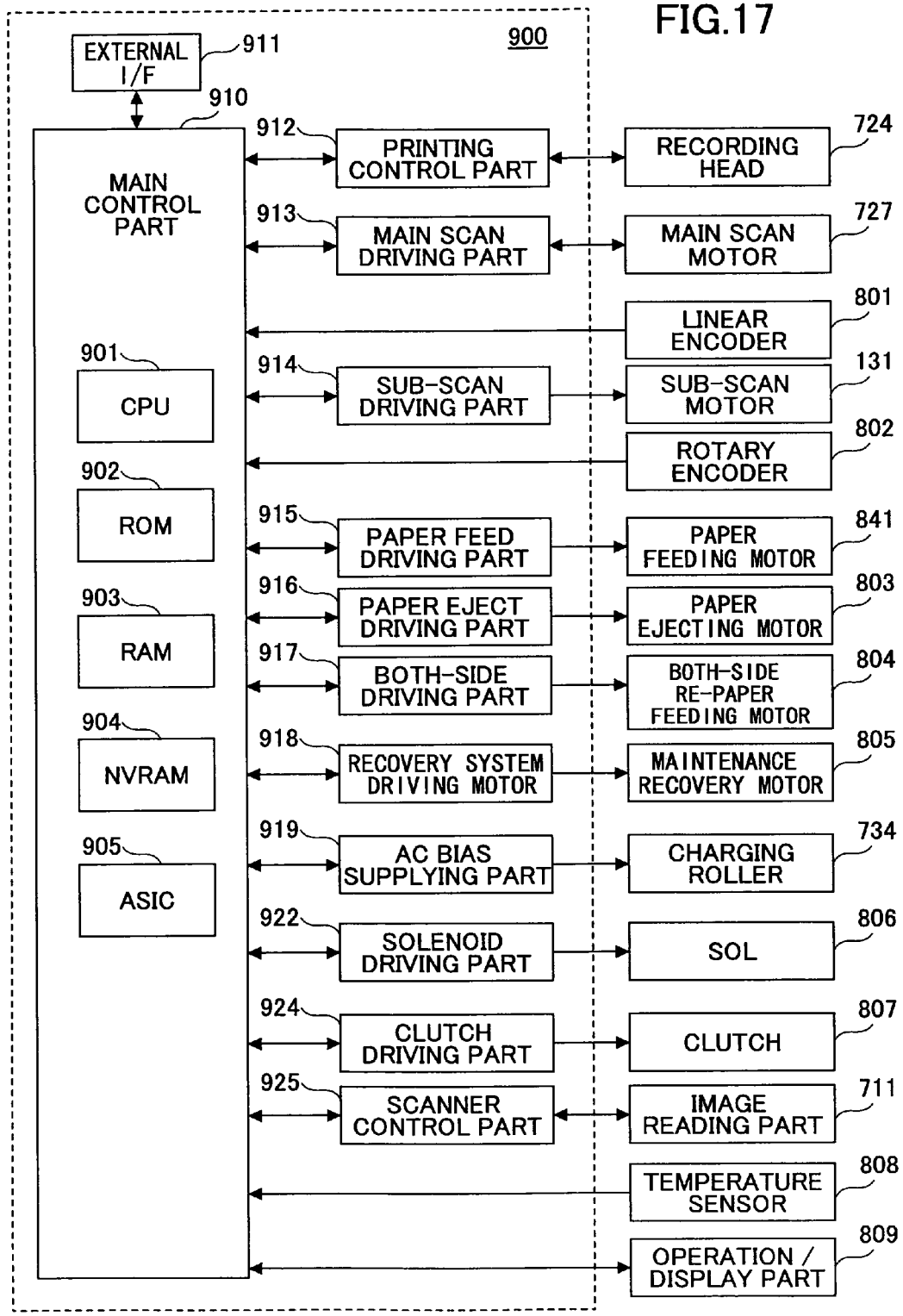
FIG. 17 shows a block diagram illustrating one example of the control part of the image forming apparatus.

Next, a control part of the image forming apparatus will now be described in general with reference to FIG. 17 which shows a block diagram.

This control part 900 has a main control part 910 which includes a CPU 901, a ROM 902 storing a program which the CPU 901 executes and other fixed data, a RAM 903 temporarily storing image data or such, a nonvolatile memory (NVRAM) 904 holding data even during the power supply to the apparatus being broken, and an ASIC 905 carrying out image processing according to the present invention including halftoning on an input image.

Further, the control part 900 has an external I/F 911 between the host side and the main control part 910 for transmitting/receiving data or signals therebetween, a printing control part 912 including a head driver control driving of the recording head 724, a main scan driving part (motor driver) 913 driving the main scan motor 927 moving the carriage 923 for scanning, a sub-scan driving part 914 driving the sub-scan motor 931, a paper feeding driving part 915 driving the paper feeding motor 814, a both-side driving part 917 driving a both-side re-paper feeding motor 804 driving respective rollers of a both-side unit not shown, a recovery system driving part 918 driving a maintenance recovery motor 805 driving a maintenance recovery mechanism and an AC bias supplying part 919 supplying the AC bias to the charging roller 734.

Further, the control part 900 has a solenoid driving part (driver) 922 driving various types of solenoids (SOL) 806, a clutch driving part 924 driving an electromagnetic clutch and so forth 323 for paper feeding, and a scanner control part 925 controlling the image reading part 711.

Further, the main control part 910 inputs a detection signal of a temperature sensor 808 detecting a temperature of the above-described conveying belt 731. Although not shown, in the main control part 910, detection signals are input from other various types of sensors. Further, the main control part 910 carries out taking various types of key inputs from a ten-key, a printing start key, or such, and necessary key inputs with an operation/display part 809 including various types of indicators, and outputs display information thereto.

Further, to the main control part 910, an output signal (pulses) from a linear encoder 801 for detecting a moving amount and a moving speed of the carriage 723, and an output signal (pulses) from a rotary encoder 802 for detecting a moving speed and a moving amount of the conveying belt 731, are input, the main control part 910 controls driving of the main scan motor 727 and the sub-scan motor 731 via the main scan driving part 913 and the sub-scan driving part 914 based on the respective output signals and correlation relationship among these respective output signals, thus, moves the carriage 723, moves the conveying belt 731 and conveys the paper sheet 705, appropriately.

Image forming operation in the thus-configured image forming apparatus will now be described briefly. A positive-and-negative-polarity rectangular-wave high-voltage alternate-current voltage is applied to the charging roller 734 from the AC bias supplying part 919, positive and negative charges are applied to the surface layer of the conveying belt 731 alternately along the conveying direction as a result of the insulating layer (surface layer) of the conveying belt 731 being contacted by the charging roller 734, charging is carried out at the predetermined charging widths on the conveying belt 731, and a non-uniform electric field is generated.

Then, when the paper sheet 705 is fed by the paper feeding part 704 or such onto the conveying belt 731 on which the non-uniform electric field is thus generated as a result of the positive and negative charges being formed, between the conveying roller 732 and the pressing roller 736, the paper sheet 705 is instantaneously polarized according to the direction of the electric field, is attracted by the conveying belt 731 by means of electrostatic force, and is moved and conveyed along with movement of the conveying belt 731.

Then, the conveying belt 731 intermittently conveys the paper sheet 705, the liquid drops of the recording liquids are jet by the recording head 724 according to the printing data on the paper sheet 705, thus an image is formed (printed) there, then a leading edge of the paper sheet 705 on which the image is thus formed is separated from the conveying belt 731 by means of a separating claw, and the paper sheet 705 is ejected to the paper ejecting tray 707.

Thus, also in the case where, in the image forming apparatus, the original image read by means of the scanner 711 is provided as the input image, and the plurality of types of halftoning processing methods are adopted according to respective image parts as described above for example, difference in colors and tones in the output image can be reduced, and thus, high quality image can be obtained.

Further, the present invention is not limited to the above-described embodiments, and variations and modifications may be made without departing from the basic concept of the present invention claimed below.

The present application is based on Japanese Priority Application Nos. 2005-266283 and 2006-243684, filed on Sep. 14, 2005 and Sep. 8, 2006, respectively, the entire contents of which are hereby incorporated herein by reference.

What is claimed is:

1. An image processing method comprising:
   performing, by an image processing apparatus, a plurality of types of halftoning processing methods in combination of amplitude modulation having a number of tone levels smaller than that of an input image and area coverage modulation, selectively or in parallel,
   one of said plurality of types of halftoning processing methods performed by the image processing apparatus including an error diffusion process; and
   converting, by the image processing apparatus, input image data into data having a number of bits larger than that of the input image data,
   the data having the number of bits larger than that of the input image data being used as input data of the error diffusion process performed by the image processing apparatus.

2. The image processing method as claimed in claim 1, wherein:
   different types of halftone processing methods are carried out in the same image according to types or color ranges of particular objects of the give image.

3. The image processing method as claimed in claim 1, wherein:
designated types of halftoning processing methods are carried out in the same given image according to respective designated image parts thereof.

4. The image processing method as claimed in claim 3, wherein:
said designated image parts correspond to the types, color ranges or coordinate ranges of the respective objects.

5. The image processing method us claimed in claim 1, wherein:
said plurality of types of halftoning processing methods are carried out with the use of a lookup table, a function expression or a combination thereof, set in such a manner that the colors or the tones of the output image may become desired ones.

6. The image processing method as claimed in claim 5, wherein:
output of the lookup table or the function expression comprises the data having the number of bits larger than that of the input image data.

7. The image processing method as claimed in claim 6, wherein:
said lookup table or function expression used in the halftoning processing according to the error diffusion method is set particularly for each color.

8. The image processing method as claimed in claim 6, wherein:
said lookup table or function expression used in the halftoning processing according to the error diffusion method does not use, as an output tone, for an intermediate tone range other than the maximum tone and the minimum tone, such a tone as that having a uniform tone in the area converge modulation halftoning.

9. The image processing method as claims in claim 6, wherein:
based on measurement results for tone characteristics obtained from halftoning processing other than that according to the error diffusion method, the lookup table or the function expression is configured with the use of tones closest to those selected from among output tones of the halftoning processing according to the error diffusion method.

10. A computer readable medium tangibly embodying a program of instructions executable by a computer to perform an image processing method comprising:
carrying out a plurality of types of halftoning processing methods in combination of amplitude modulation having a number of tone levels smaller than that of an input image and area coverage modulation, selectively or in parallel,
one of said plurality of types of halftoning processing methods including an error diffusion process;
converting input image data into data having a number of bits larger than that of the input image data,
the data having the number of bits larger than that of the input image data being used as input data of the error diffusion process.

11. An image processing apparatus comprising:
a halftoning processing part configured to perform a plurality of types of halftoning processing methods in combination of amplitude modulation having the number of tone levels smaller than that of an input image and area coverage modulation, selectively,
one of said plurality of types of halftoning processing methods including an error diffusion process,
the halftoning processing part converting input image data into data having a number of bits larger than that of the input image data,
the data having the number of bits larger than that of the input image data being used as input data of the error diffusion process.

12. The image processing apparatus as claimed in claim 11, further comprising:
a data output part configured to output data for forming an output image, based on data output from the error diffusion process performed by the halftoning processing part.

13. The image processing apparatus as claimed in claim 11, further comprising:
a selecting part configured to select one of the plurality of types of halftoning processing methods,
wherein the selected halftoning processing method is performed by said halftoning processing part, and data output from the selected halftoning processing method performed by said halftoning processing part is utilized to an output image.

14. The image processing apparatus as claimed in claim 11, wherein colors and tones in an image represented by data output from the error diffusion process performed by the halftoning processing part are substantially identical to those in an image represented by data output from another of the plurality of types of halftoning processing methods performed by said halftoning processing part.

* * * * *